US 9,873,251 B2

(12) United States Patent
Togashi

(10) Patent No.: US 9,873,251 B2
(45) Date of Patent: Jan. 23, 2018

(54) METHOD OF MANUFACTURING FLOW PATH MEMBER, FLOW PATH MEMBER, AND LIQUID EJECTING HEAD

(71) Applicant: SEIKO EPSON CORPORATION, Tokyo (JP)

(72) Inventor: Isamu Togashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/298,451

(22) Filed: Oct. 20, 2016

(65) Prior Publication Data
US 2017/0120586 A1 May 4, 2017

(30) Foreign Application Priority Data

Oct. 30, 2015 (JP) ................. 2015-214960

(51) Int. Cl.
B41J 2/14 (2006.01)
B41J 2/16 (2006.01)
B29C 65/16 (2006.01)
B29C 65/82 (2006.01)
(Continued)

(52) U.S. Cl.
CPC ......... B41J 2/1433 (2013.01); B29C 65/1635 (2013.01); B29C 65/8253 (2013.01); B29C 66/322 (2013.01); B29C 66/54 (2013.01); B29C 66/81267 (2013.01); B41J 2/161 (2013.01); B41J 2/1607 (2013.01); B41J 2/1623 (2013.01); B41J 2/1634 (2013.01); B41J 2/1637 (2013.01);
(Continued)

(58) Field of Classification Search
CPC ........ B41J 2/1433; B41J 2/1623; B41J 2/175; B41J 2/1634; B41J 2/161; B41J 2/1607; B41J 2/1637; B41J 2002/14419; B29C 65/1635; B29C 65/8253; B29C 66/1634; B29C 66/81267; B29C 66/54
See application file for complete search history.

(56) References Cited

U.S. PATENT DOCUMENTS

2004/0095444 A1 5/2004 Drummond et al.
2005/0068381 A1 3/2005 Morita
2009/0152326 A1 6/2009 Shin et al.
(Continued)

FOREIGN PATENT DOCUMENTS

EP 2529934 A1 12/2012
JP 2009095800 A 5/2009
(Continued)

OTHER PUBLICATIONS

European Search Report for Application No. 16196236.0 dated Mar. 28, 2017.
(Continued)

Primary Examiner — Juanita D Jackson
(74) Attorney, Agent, or Firm — Workman Nydegger

(57) ABSTRACT

A method of manufacturing a flow path member which forms a flow path such that a concave portion provided on a first surface of a first member is covered with a second surface of a second member, the method includes introducing a part of a fused director to an inner side of the concave portion when viewed from a direction in which the first member and the second member are laminated; and fixing the first member and the second member by curing the fused director in a state where the concave portion is covered with the second surface to form a flow path.

8 Claims, 18 Drawing Sheets

(51) Int. Cl.
 B29C 65/00 (2006.01)
 B41J 2/175 (2006.01)
(52) U.S. Cl.
 CPC ...... *B41J 2/175* (2013.01); *B41J 2002/14419* (2013.01)

(56) References Cited

U.S. PATENT DOCUMENTS

2011/0083758 A1* 4/2011 Tsujiuchi ............ B29C 65/1635
 137/561 R
2014/0009537 A1 1/2014 Togashi

FOREIGN PATENT DOCUMENTS

JP 2014-012370 1/2014
WO 2014046652 A1 3/2014

OTHER PUBLICATIONS

European Search Report for Application No. 16196236 dated Jul. 20, 2017.

\* cited by examiner

METHOD OF MANUFACTURING FLOW PATH MEMBER, FLOW PATH MEMBER, AND LIQUID EJECTING HEAD

BACKGROUND

1. Technical Field

The present invention relates to a method of manufacturing a flow path member having a flow path, the flow path member, and a liquid ejecting head providing with the flow path member.

2. Related Art

A representative example of a liquid ejecting head for ejecting a liquid droplet includes an ink jet recording head for ejecting an ink droplet. For example, the ink jet recording head is provided with a head main body for ejecting the ink droplet from a nozzle opening and a flow path member for supplying an ink to the head main body.

As the flow path member, a flow path member formed by welding a plurality of members has been proposed (for example, refer to JP-A-2014-012370). In such a flow path member, since the one welding member is a functional member such as a filter, if a welding portion flows into a flow path, a case where an effective area of the filter is reduced, or the like occurs. Thus, the function in the member is lost. Therefore, the flow path member is configured such that the welding portion is positioned away from the flow path.

However, in a case where two members are welded with each other and the flow path is formed in the interface therebetween, if the welding portion is positioned away from the flow path, a concave portion is formed within the flow path. Specifically, when a director to be used for welding is disposed in a location apart from the flow path, the concave portion that opens the flow path is formed by the director. In the concave portion of the flow path, there are problems in that a liquid flow is being stagnated, air bubble dischargeability is deteriorated such that air bubbles reside and grow in the concave portion, and reliability is deteriorated.

Such a problem is not limited to the flow path member to be used in the ink jet recording head, and the same problems exist in a flow path member to be used in other devices.

SUMMARY

An advantage of some aspects of the invention is to provide a method of manufacturing a flow path member with improved reliability, a flow path member, and a liquid ejecting head.

According to an aspect of the invention, there is a provided a method of manufacturing a flow path member which forms a flow path such that a concave portion provided on a first surface of a first member is covered with a second surface of a second member. The method includes introducing a part of a fused director to an inner side of the concave portion when viewed from a direction in which the first member and the second member are laminated, and fixing the first member and the second member by curing the fused director in a state where the concave portion is covered with the second surface and forming a flow path.

According to the aspect, air bubble dischargeability can be improved by suppressing the formation of the recess which causes the liquid to be stagnated between the director and the flow path, in the inner surface of the flow path formed by the concave portion and the second surface.

In a case where the first surface is combined with the second surface, it is preferable that the fused director flows with respect to a portion of which a cross-section has an acute angle, when viewed from a direction perpendicular to the lamination direction. According to the aspect, in the portion of which the angle is acute, stagnation of the liquid likely occurs. However, by introducing the director to the portion of which the angle is acute, the formation of a portion of which the stagnation occurs can be suppressed.

It is preferable that the concave portion has a shape in which a width of the cross-section becomes the largest at an opening portion, when viewed from a direction perpendicular to the lamination direction. According to the aspect, the first member can be easily and inexpensively manufactured by molding the first member. In addition, a portion of which the first surface comes into contact with the second surface likely forms an acute angle, and the fused director is likely introduced to the portion of which the first surface comes into contact with the second surface due to capillary force.

It is preferable that the concave portion has a vertex portion at a side opposite to the second member. According to the aspect, if the vertex portion is disposed so that the vertex portion is facing vertically upward, the air bubble dischargeability can be improved by collecting the air bubbles on the top.

It is preferable that the director before being subjected to a fusion treatment is provided on the first member and has a wall surface which is flush with a wall surface defining the concave portion. According to the aspect, the distance between the director and the concave portion becomes smaller, and the fused director is likely to be introduced to the inner side of the concave portion.

It is preferable that the director before being subjected to the fusion treatment is provided on the first member and has a shape in which the width of the director continues gradually decreasing from the first surface side toward the second surface side. According to the aspect, a load to bring the tip end surface of the director into contact with the second surface can be increased. Accordingly, the first member and the second member can be reliably fixed thereto.

It is preferable that the fused director is cured into a concave curved surface shape (in other words, inward-curving surface) which is obtained by connecting the second surface and the concave portion. According to the aspect, an angle formed of the top surface of the director, and the inner surface of the concave portion and the second surface can be increased. Accordingly, the formation of the portion of which the flow of the liquid is stagnated can be suppressed. By connecting the inner surface of the concave portion and the second surface by the director, a welding area can be increased and the can be firmly fixed.

It is preferable that the second member includes a convex portion which is projected toward the first member side and in which a tip end surface is the second surface, and the width of the second surface is longer than a width of the director. According to the aspect, even when the first member and the second member are displaced in a width direction, the flow path can be reliably formed. In addition, the occurrence of variations in the fixing strength can be suppressed by suppressing the reduction of the welding area. Furthermore, by providing the second surface on only the tip end surface of the convex portion, surface accuracy of the second surface can be improved.

It is preferable that in the second member, a step portion is formed by the convex portion, and the fused director flows into the step portion. According to the aspect, by increasing the fusing area between the first member and the second member, the fixing strength between the first member and the second member can be improved.

It is preferable that the thickness of the first member in the first surface is larger than a thickness of the second member in the second surface, and the transmittance of the second member with respect to an arbitrary wavelength is higher than a transmittance of the first member with respect to the same wavelength. According to the aspect, in a case where the director is fused with laser light, by reducing the thickness of the second member more than that of the first member, energy efficiency can be improved.

It is preferable that with respect to an interface between the first surface of the second surface, a depth of the first member side of the flow path is larger than a depth of the second member side of the flow path. According to the aspect, by forming the deep flow path to the first member, a wasted region is reduced. Accordingly, the member cab be efficiently used.

It is preferable that inspecting a position of the director cured via the second member is further provided. According to the aspect, since an introducing position of the fused director can be inspected nondestructively, the reliability can be improved.

It is preferable that the first member has a plurality of the concave portions, the second member has a plurality of the convex portions which projects toward the first member side and in which the tip end surfaces are the second surfaces, and the adjacent convex portions are defined by the step portion that is a common recess. According to the aspect, since one step portion can define the plurality of second members in common, the plurality of second member is easily provided.

Furthermore, according to another aspect of the invention, there is provided a flow path member including a flow path which is defined by a first wall defined by a first member in which a transmittance with respect to an arbitrary wavelength is a first value, a second wall defined by a second member in which the transmittance with respect to the same wavelength is a second value greater than the first value, and a third wall defined by a third member in which the transmittance with respect to the same wavelength is a third value between the first value and the second value, in which the third wall is disposed in an interface between the first wall and the second wall, and in which the third wall comes in contact with the first wall and the second wall respectively, at an angle larger than an angle of a portion of which the first wall virtually comes into contact with the second wall.

According to this aspect, by providing the third wall which comes into contact with the interface between the first wall and the second wall at a relatively larger angle between the first wall and the second wall, the formation of the recess where the stagnation of the liquid occurs in the flow path is suppressed. Accordingly, the air bubble dischargeability can be improved. In addition, since the third member is provided in the interface between the first wall and the second wall, the position of the third member can be confirmed nondestructively via the second member and the reliability can be improved.

Here, it is preferable that the width of the second wall is smaller than the width of the first wall. According to the aspect, since the third member occupies a range while the width of the second wall is smaller than the first wall, the third member is easily confirmed from the second member side.

It is preferable that a width in the cross-section of the flow path defined by the first wall becomes the largest at an opening portion. According to the aspect, the first member can be easily and inexpensively manufactured by molding the first member.

It is preferable that the flow path includes a vertex portion on a side facing the second member. According to the aspect, if the vertex portion is disposed so that the vertex portion is facing vertically upward, the air bubble dischargeability can be improved by collecting the air bubbles on the top surface.

It is preferable that the third wall of the third member has a concave curved surface obtained by connecting the first wall and the second wall. According to the aspect, angles of the third wall and the first wall and the second wall can be increased. Accordingly, the formation of the portion of which the flow of the liquid is stagnated can be suppressed.

It is preferable that in a portion of which the flow path is formed, the thickness of the first member is larger than the thickness of the second member. According to the aspect, in a case where the director is fused and cured with laser light to form the third member, by reducing the thickness of the second member more than that of the first member, energy efficiency can be improved.

It is preferable that with respect to the interface between the first wall and the second wall, the depth of the first member side of the flow path is larger than the depth of the second member side on the flow path. According to the aspect, by forming the deep flow path to the first member, a wasted region is reduced. Accordingly, the member can be efficiently used.

Furthermore, according to still another aspect of the invention, there is provided a liquid ejecting head including the flow path member according to the above aspect.

According to this aspect, the liquid ejecting head with improved reliability can be obtained by improving air bubble dischargeability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, the invention will be described in detail based on embodiments.

Embodiment 1

Figure 1:
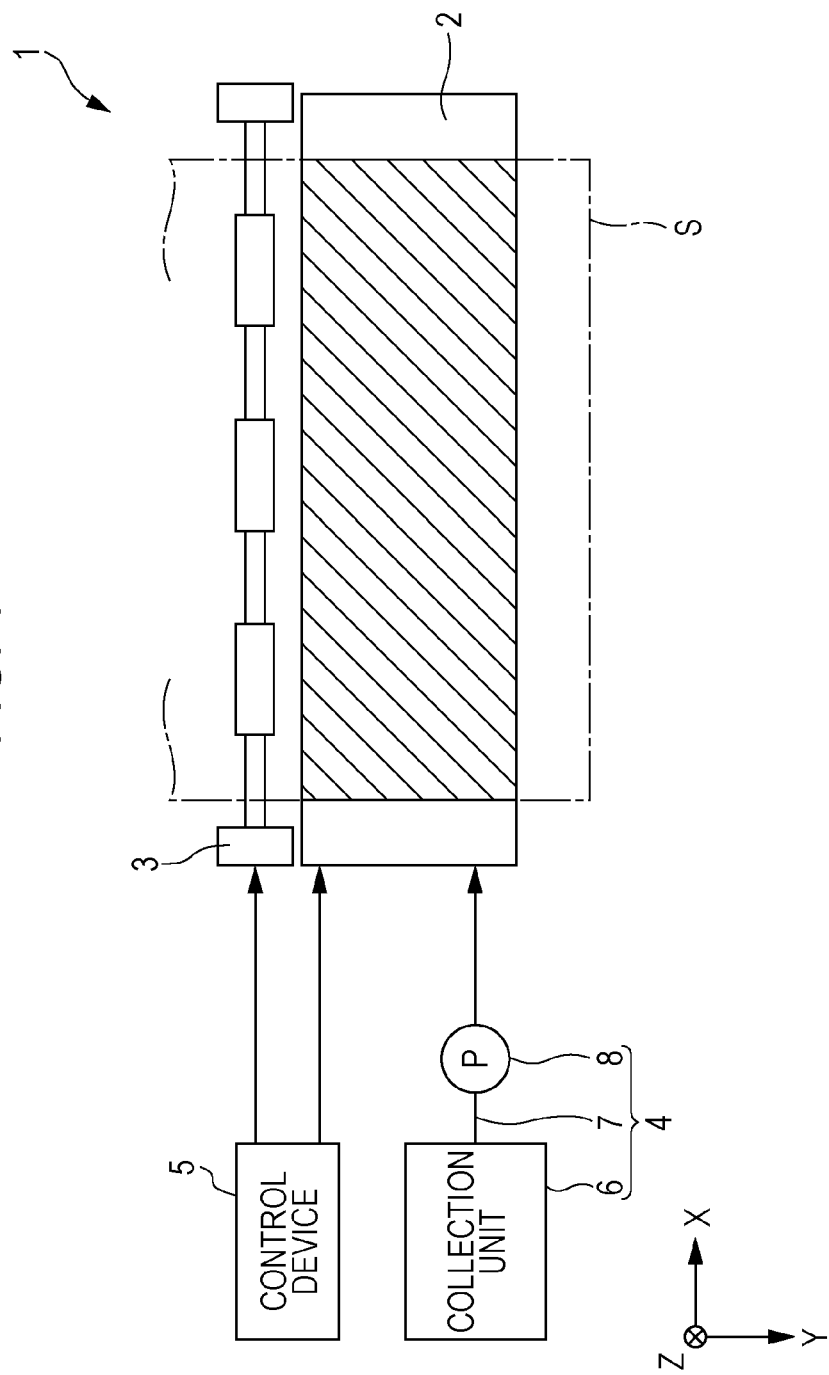
FIG. 1 is a plan view illustrating a schematic configuration of a recording apparatus according to Embodiment 1 of the invention.

FIG. 1 is a plan view showing an ink jet recording apparatus that is an example of a liquid ejecting apparatus according to Embodiment 1 of the invention.

An ink jet recording apparatus 1 that is an example of the liquid ejecting apparatus according to the present embodiment is a so-called ink jet recording apparatus for printing only by transporting a recording sheet S that is an ejection medium such as paper or a resin sheet.

In the present embodiment, a transporting direction of the recording sheet S is defined as a second direction Y, and in an in-plane direction of a landing surface of the recording sheet S on which an ink is landed, a direction perpendicular to the second direction Y is defined as a first direction X. In addition, a direction perpendicular to the both directions of the first direction X and the second direction Y is defined as a third direction Z. In the present embodiment, there is described that each of the directions (X, Y, and Z) is perpendicular to each other, as an example, but it is not limited thereto.

The ink jet recording apparatus 1 is provided with an ink jet recording head 2 (hereinafter, simply referring to as the recording head 2) that is an example of the liquid ejecting head which ejects an ink as a liquid, a transporting mechanism 3 which transports the recording sheet S along the second direction Y, a feeder 4 which feeds the ink to the recording head 2, and a control device 5.

The recording head 2 extends along the first direction X. The recording head 2 according to the present embodiment is provided with a plurality of main bodies which is arranged in a first direction X and ejects the ink and a flow path member which supplies the ink to each head main body, as will be described later in detail.

The feeder 4 is provided with a reservoir 6 such as an ink cartridge or an ink tank in which the ink is stored, a supply pipe 7 such as a tube which is communicated with the reservoir 6 and the recording head 2, and a pump 8 that is a pumping unit which is provided on the way of the supply pipe 7 and pumps the ink in the reservoir 6 to the recording head 2. The ink in the reservoir 6 is pumped by the pump 8 and supplied to the recording head 2 via the supply pipe 7. If a pumping unit can supply the ink form the reservoir 6 to the recording head 2, the pumping unit is not particularly limited thereto, for example, the pumping unit may be a pushing unit which pushes the reservoir 6 from the outside. In addition, as the pumping unit, a pumping unit using a hydraulic head difference generated by adjusting a relative position between the recording head 2 and the reservoir 6 in a vertical direction may be used. Also, the feeder 4 may be an ink cartridge which is directly mounted on the recording head 2 or the like.

The transporting mechanism 3 transports the recording sheet S along the second direction Y, and in the present embodiment, the transporting mechanism 3 is provided with a driving unit (not shown) such as a driving motor which drives a transporting roller and the transporting mechanism 3. Also, the transporting mechanism 3 is not limited thereto, for example, the transporting mechanism 3 may be an endless belt rotated.

The control device 5 performs overall control of the ink jet recording apparatus 1. In particular, the recording sheet S is transported by control the transporting mechanism 3 based on a print signal from the outside and printing is performed by controlling the ejection of the ink droplet from the recording head 2.

Figure 2:
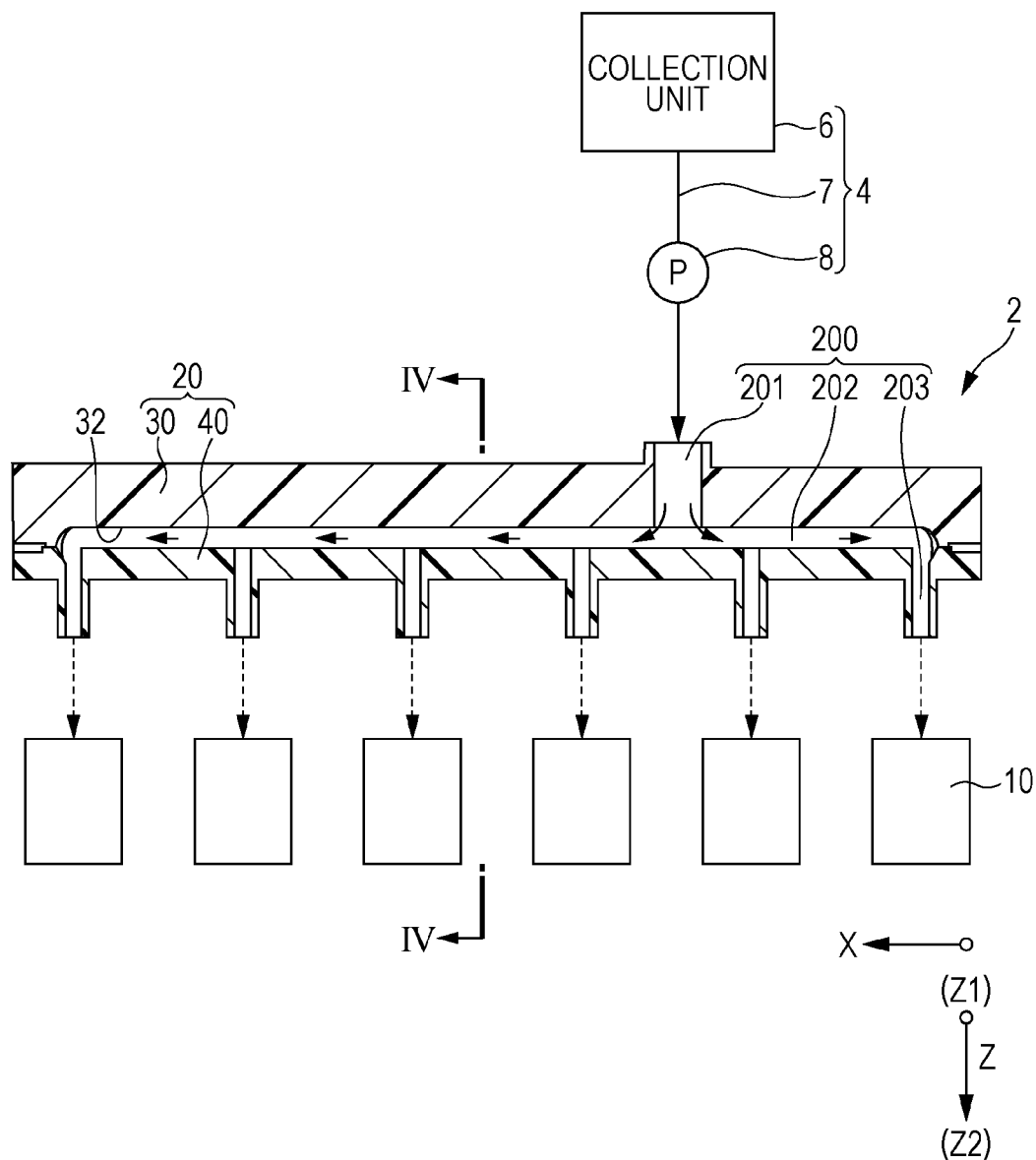
FIG. 2 is a sectional view illustrating an essential part of a flow path configuration of a recording head according to Embodiment 1 of the invention.

Here, an example of such the recording head 2 provided on ink jet recording apparatus 1 according to the present embodiment will be described with reference to FIG. 2. FIG. 2 is a sectional view illustrating an essential part of a flow path configuration of a recording head. In addition, in the present embodiment, each direction of the recording head 2 will be described based on directions when mounting on the ink jet recording apparatus 1, that is, the first direction X, the second direction Y, and the third direction Z.

As shown in FIG. 2, the recording head 2 is provided with a plurality of head main bodies 10 which ejects the ink and a flow path member 20 which feeds the ink fed from the feeder 4 to the head main body 10.

Figure 3:
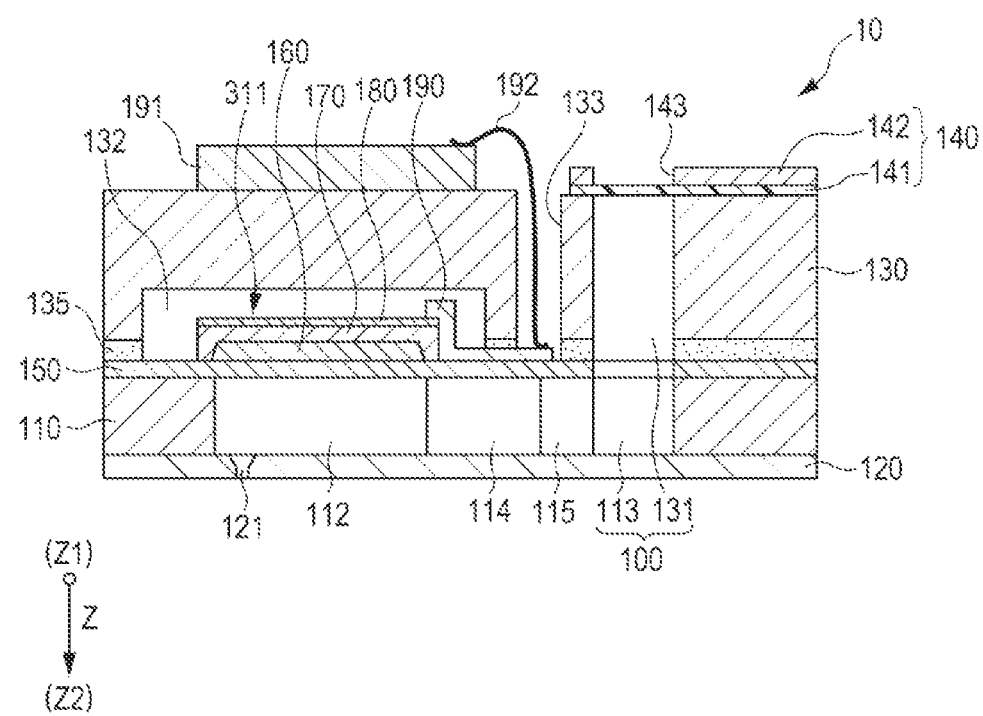
FIG. 3 is a sectional view of a head main body according to Embodiment 1 of the invention.

First, an example of the head main body 10 according to the present embodiment will be described with reference to FIG. 3. FIG. 3 is a sectional view of the head main body according to the present embodiment of the invention.

As shown in FIG. 3, a flow path formed substrate 110 which configures the head main body 10 according to the present embodiment is formed of a silicon single-crystal substrate, on the one surface thereof, a vibrating plate 150 is formed. The vibrating plate 150 may be a single layer or a multiple layer selected from a silicon dioxide layer and a zirconium oxide layer.

A plurality of pressure generation chambers 112 is arranged on the flow path formed substrate 110. In addition, in a region of outside of the pressure generation chamber 112 of the flow path formed substrate 110, a communicating unit 113 is formed, and the communicating unit 113 and each of the pressure generation chambers 112 are communicated with each other, via an ink supply path 114 and a communicating path 115 which are provided for each pressure generation chamber 112. The communicating unit 113 configures a part of a manifold 100 which is communicated with a manifold unit 131 of a protection substrate 130 to be described and is to be a common ink chamber of each pressure generation chamber 112. The ink supply path 114 is formed with a width narrower than the pressure generation chamber 112, and constantly maintains a flow path resistance of the ink which enters the pressure generation chamber 112 from the communicating unit 113.

In addition, in one surface side of the flow path formed substrate 110 in the third direction Z, in the present embodiment, in a Z2 side that is the recording sheet S side, a nozzle plate 120, into which a nozzle opening 121 communicating with the vicinity of the end portion opposite to the ink supply path 114 of each pressure generation chamber 112 is drilled, is fixed with an adhesive, a heat weld film, or the like. The nozzle plate 120, for example, is formed from glass ceramics, a silicon single crystal substrate, stainless steel, or the like.

On the other hand, on the surface of the Z1 side which is the side opposite to the nozzle opening 121 of the flow path formed substrate 110 in the third direction Z, the vibrating plate 150 is formed. On the vibrating plate 150, a first electrode 160, a piezoelectric material layer 170, the a second electrode 180 form a film and are laminated by a lithography method, and the laminate configures a piezoelectric actuator 11. In the present embodiment, the piezoelectric actuator 11 is a pressure generating unit which causes a change in pressure of the ink in the pressure generation chamber 112. Here, the piezoelectric actuator 11 is also referred to as a piezoelectric element 11 and indicates a portion including the first electrode 160, the piezoelectric material layer 170, and the second electrode 180. In general, it is configured such that any one of the electrodes of the piezoelectric actuator 11 is set as a common electrode, and the other electrode and the piezoelectric material layer 170 are patterned for each pressure generation chamber 112. In the present embodiment, the first electrode 160 is set as the common electrode of the piezoelectric actuator 11, and the second electrode 180 is set as an individual electrode of the piezoelectric actuator 11. However, there is no problem even if the setting is reversed for the convenience of the driving circuit or a wiring. In the above-described example, the vibrating plate 150 and the first electrode 160 are operated as a vibrating plate. But it limited thereto. For example, only the first electrode 160 may be operated as the vibrating plate without the vibrating plate 150. In addition, the piezoelectric actuator 11 itself may function as the vibrating plate.

In addition, in such a second electrode 180 of each piezoelectric actuator 11, lead electrodes 190 are connected, respectively. A voltage is selectively applied to each piezoelectric actuator 11 via the lead electrode 190.

In addition, on the surface of the Z1 side of the flow path formed substrate 110, a protection substrate 130 including the manifold unit 131 configuring at least a part of the manifold 100 is adhered via an adhesive 135. In the present embodiment, the manifold unit 131 is formed so as to extend in the width direction of the pressure generation chamber 112 through the protection substrate 130 in the third direction Z. As described above, the manifold unit 131 is communicated with the communicating unit 113 of the flow path formed substrate 110 to configure the manifold 100 that is an ink chamber common with each pressure generation chamber 112.

In addition, in a region facing the piezoelectric actuator 11 of the protection substrate 130, a piezoelectric element holding portion 132 with a space at a level of not impeding the movement of the piezoelectric actuator 11 is provided. The piezoelectric element holding portion 132 may have a space at a level of not impeding the movement of the piezoelectric actuator 11. The space may be sealed, and may be unsealed.

As such a protection substrate 130, a material having almost same as that of a coefficient of thermal expansion of the flow path formed substrate 110 is preferably used, and in the present embodiment, the protection substrate 130 is formed using a silicon single crystal substrate having the same material as that of the flow path formed substrate 110.

In addition, in the protection substrate 130, a through-hole 133 passing through the protection substrate 130 in the third direction Z is provided. The vicinity of the end portion of the lead electrode 190 drawn out of each piezoelectric actuator 11 is provided so as to being exposed into the through-hole 133.

In addition, in the surface of the Z1 side of the protection substrate 130, a driving circuit 191 for driving the piezoelectric actuator 11 is provided. As the driving circuit 191, for example, a circuit substrate, or a semiconductor integrated circuit (IC), or the like can be used. The driving circuit 191 and the lead electrode 190 are electrically connected to each other via a connection wire 192 formed of an electrically conductive wire such as a bonding wire.

In addition, in such a protection substrate 130, a compliance plate 140 which is made of a sealing film 141 and a fixing plate 142 is adhered. Here, the sealing film 141 is made of a material with low rigidity and with flexibility. One surface of the manifold unit 131 is sealed with the sealing film 141. In addition, the fixing plate 142 is formed by a relatively hard material. Since the region facing the manifold 100 of the fixing plate 142 becomes an opening 143 completely removed in a thickness direction, one surface of the manifold 100 is sealed with only the sealing film 141 with flexibility.

In such a head main body 10 according to the present embodiment, the ink is removed from the feeder 4 shown in FIG. 1 via the flow path member 20, the inner portion from the manifold 100 to the nozzle opening 121 is filled with the ink, and then, a voltage is applied between the first electrode 160 and the second electrode 180 corresponding to the pressure generation chamber 112 according to the driving signal from the driving circuit 191. By flexurally deforming the vibrating plate 150 and the piezoelectric actuator 11, the pressure inside each pressure generation chamber 112 increase, and the ink droplet is ejected from the nozzle opening 121.

A plurality of head main bodies 10 is connected to one flow path member 20, and in the present embodiment, six head main bodies 10 are connected thereto and configures the recording head 2. The arrangement direction of the head main bodies 10 with respect to the flow path member 20 is not particularly limited. For example, the arrangement direction of the nozzle opening 121 is disposed in a direction inclined with respect to the second direction Y, that is, a direction intersecting the first direction X and the second direction Y, and the plurality of head main bodies 10 may be arranged in a linear shape along the first direction X. In addition, the nozzle opening 121 is disposed so as to coincide with the first direction X, and the plurality of the head main bodies 10 may be disposed in a zig-zag pattern along the first direction X. Here, the description that the head main bodies 10 are disposed in a zig-zag pattern along the first direction X means that two or more rows of the head main body 10 rows, in which the head main bodies 10 are arranged in the first direction X, in the second direction Y and in the head main body 10 configured by a plurality of rows, the head main bodies 10 adjacent to each other in the first direction X are disposed such that a row of the nozzle opening 121 of the head main body 10 in one raw overlaps with a row of the nozzle opening 121 of the head main body in other row in the second direction Y. Accordingly, a long nozzle opening 121 row can be formed across the first direction X by a plurality of the head main bodies 10.

Figure 4:
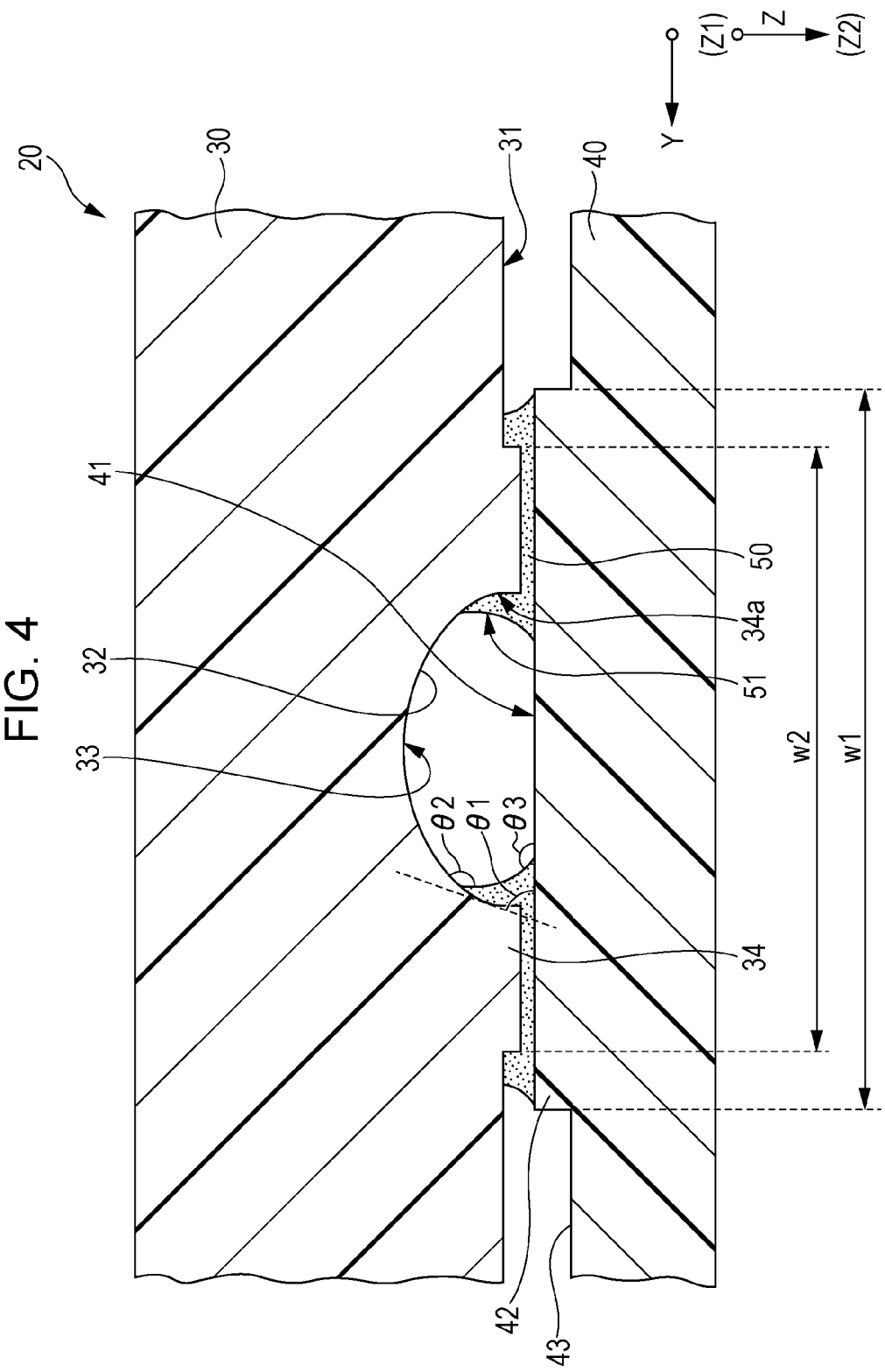
FIG. 4 is a sectional view of a flow path member according to Embodiment 1 of the invention.

Here, the flow path member 20 which supplies the ink to the head main body 10 according to the present embodiment will be described with reference FIG. 4 in addition to FIG. 2. FIG. 4 is a sectional view taken along the line IV-IV of FIG. 2.

As shown in FIG. 4, the flow path member 20 is provided with a first member 30 and a second member 40. The flow path member 20 is configured such that the first member 30 and the second member 40 are laminated in the third direction Z. That is, in the present embodiment, the laminating direction of the first member 30 and the second member 40 is the third direction Z. The first member 30 side is defined as a Z1 and the second member 40 side is defined as a Z2. The first member 30 and the second member 40 are formed of, for example, a resin material such as polypropylene. The details of the material will be described in below. In the present embodiment, a material having higher transmittance of the second member 40 with respect to the wavelength of the laser light when welding, compared to the transmittance of the first member 30 with respect to the same wavelength.

In such a flow path member 20, a flow path 200 which is connected to other end portion of the supply pipe 7 to which one end is connected to the reservoir 6 and which supplies the ink fed from the feeder 4 to the plurality of head main bodies 10 is provided. In detail, the flow path 200 is provided with a first flow path 201 which is provided on the first member 30 and is provided so as to allow the ink to flow along the third direction Z; a second flow path 202 which is communicated with the first flow path 201 and which is provided so as to allow the ink to flow along a direction perpendicular to the third direction Z, in the present embodiment, the first direction X; and a third flow path 203 which is communicated with the second flow path 202 and which is provided so as to allow the ink to flow along the third direction Z.

The first flow path 201 is provided by passing through the first member 30 in the third direction Z, and in the opposite side the end portion communicated with the second flow path 202 of the first flow path 201, the supply pipe 7 connected to the reservoir 6 is connected.

The second flow path 202 is provided in an adhesion interface between the first member 30 and the second member 40, and is provided so as to allow the ink to flow along a direction perpendicular to the first flow path 201, that is, an in-plane direction including the first direction X and the second direction Y. In the present embodiment, the second flow path 202 is provided so as to allow the ink to flow along the first direction X. An opening to the second flow path 202 of the first flow path 201 is provided at a position inside the both end portion without the both end portion of the second flow path 202. That is, the first flow path 201 is not communicated with the end portion of the second flow path 202. It is not limited thereto. The first flow path 201 may be communicated with the end portion of the second flow path 202. The second flow path 202 will be described below in detail.

The third flow path 203 is provided by passing through the second member 40 in the third direction Z. A plurality of the third flow paths 203, in the present embodiment, six third flow paths 203 are provided by communicating with the second flow path 202. An end of each third flow path 203 is communicated with the second flow path 202, and other end thereof is communicated with the head main body 10. Accordingly, the ink of the second flow path 202 is supplied to the plurality of head main bodies 10.

The second flow path 202 configuring such a flow path 200 is formed such that a concave portion 32 provided on a first surface 31 that is a surface of the second member 40 side of the first member 30 is covered with a second surface 41 that is a surface of the first member 30 side of the second member 40. In detail, the second flow path 202 is formed by a first wall 33 defined by the first member 30, the second wall 41 defined by the second member 40, and a third wall 51 defined by a third member 50 which is provided on a boundary of the first wall 33 and the second wall 41.

Here, in the present embodiment, the first wall 33 is an inner surface of the concave portion 32 which opens the first surface 31 of the first member 30. It is preferable that such a concave portion 32 has a shape where the width thereof becomes the largest at the opening portion in a cross-section viewed from the direction perpendicular to the third direction Z that is a laminating direction of the first member 30 and the second member 40, that is, in the present embodiment, a cross-section extended in the second direction Y. Here, the shape where the width of the cross section of the concave portion 32 becomes the largest at the opening portion means that in the cross-section, the width of the opening in the first surface 31 is provided while maintaining the same width or at a width continue gradually decreasing toward the first surface 31 from the second surface 41, that is, toward the Z1 in the third direction Z. On the other words, the shape where the width of the cross-section of the concave portion 32 becomes the largest at the opening portion means a shape that the width of the transverse section of the concave portion 32 does not continue gradually decreasing from the Z2 toward the Z1. That is, the shape where the width of the cross-section of the concave portion 32 becomes the largest at the opening portion includes a shape where the width of the transverse section of the concave portion 32 is maintained in the same width over the third direction Z, and a shape where the width is gradually decreasing from the Z2 toward the Z1. As such a shape of the transverse section of the concave portion 32, for example, a substantially semicircular shape, a substantially semi-ellipsoid shape, a substantially trapezoidal shape, a substantially triangle shape, and a substantially quadrilateral shape are included. Also, if the shape of the concave portion 32 is a shape where the width of the opening portion of the first surface 31 in the transverse section is the largest, the shape thereof is not limited to the above-mentioned shapes. In the present embodiment, a circular-shaped concave portion 32 with an angle of the transverse section of less than 180 degrees is formed. In this manner, by providing the shape in which the width of the transverse section of the concave portion 32 becomes the largest at the opening portion, the angle of the first wall 33 that is an inner surface of the concave portion 32 and the first surface 31 can be equal to or less than 270 degrees. Accordingly, the first member 30 having the concave portion 32 can be easily and inexpensively manufactured by molding the first member 30. In addition, by providing the shape where the width of the cross section of the concave portion 32 becomes the largest at the opening portion, an angle of a portion of which the first wall 33 virtually comes into contact with the second surface 41 of the concave portion 32 can be decreased to equal to or less than 90 degrees. Furthermore, by providing the shape where the width of the cross section of the concave portion 32 becomes the largest at the opening portion, an angle of the portion of which the first wall 33 virtually comes into contact with the second surface 41 can be decreased to equal to or less than 90 degrees, and more preferably decreased at a shape angle. Accordingly, by reducing the depth of the concave portion 32 in the third direction Z from the first surface 31, the flow rate of the ink which flows into the second flow path 202 can be increased. Therefore, dischargeability of foreign objects such as air bubbles included in the ink can be improved. If the concave portion 32 is too deep, the area of the transverse section of the second flow path 202 increases, and a portion of which the flow of the liquid is stagnated occurs. Therefore, there is concerned that the dischargeability of the foreign objects such as the air bubbles may be deteriorated. In addition, in the present embodiment, since the concave portion 32 has a circular-shaped with an angle of the transverse section of less than 180 degrees, the vertex portion is provided in the Z1 side in the third direction Z. Accordingly, when the Z1 in the third direction Z is disposed upward in a vertical direction, the air bubbles are collected to the vertex portion of the concave portion 32 by buoyancy, and the air bubbles can be easily discharged.

In such a first member 30, continuous directors 34 are provided over the range of the opening of the concave portion 32 of the first surface 31. The directors 34 are provided so as to protrude from the first surface 31 toward the second member 40 side. In the present embodiment, the directors 34 are provided integrally continuous from the first member 30. By welding such a director 34 in a state where the tip end surface comes into contact with the second member 40, the director 34 is melted with a part of the second member 40 and is used for subjecting the first member 30 and the second member 40 to a fusing treatment. By subjecting the director 34 to the fusing treatment, the director 34 is introduced inside than the concave portion 32 on plan view from the third direction Z and the third member 50 is formed. The director 34 includes a wall surface 34a which is flush with the first wall 33 that is an inner surface of the concave portion 32. Accordingly, a part of the director 34 can be reliably introduced into the inner side than the concave portion 32 by subjecting a part of the director 34 to the fusing treatment. In the present embodiment, the wall surface 34a of the director 34 is provided along a normal direction with respect to the first surface 31, that is, along the third direction Z. Accordingly, an angle of the portion in which the director 34a comes into contact with the second surface 41 is 90 degrees. The wall surface 34a also may be formed into an inclined surface which is inclined such that the opening side is extended with respect to the second surface 41. In addition, the wall surface 34a may be formed in a curved surface, in particular, a concave curved surface. By the way, the wall surface 34a of the director 34 may be provided so as to protrude inside the concave portion 32. However, the first member 30 which integrally have the directors 34 cannot be formed by molding the first member 30. That is, by providing the wall surface 34a of the director 34 at the same position as that of the opening edge portion of the first surface 31 side of the concave portion 32 or providing the wall surface 34a so as to be inclined such that the opening is extended outside the position, the first member 30 can be inexpensively manufactured with high accuracy by molding the first member 30. In addition, by providing the wall surface 34a of the director 34 at the same position as that of the opening edge portion of the first surface 31 side of the concave portion 32 or providing the wall surface 34a so as to be inclined such that the opening is extended outside the position, the second surface 41 and the wall surface 34a can be disposed at an angle of 90 degrees or less. Accordingly, the fused director 34 can easily feed into the corner portion of the wall surface 34a of the director 34 and the second surface 41 by capillary force.

The second member 40 includes a second surface 41 in the first member 30 side. In the present embodiment, the second member 40 includes a convex portion 42 which projects to the first member 30 side, that is, the Z1 side, and the tip end surface of the convex portion 42 is the second surface 41. That is, the second surface 41 is defined by the convex portion 42. The convex portion 42 is defined by a step portion 43 that is a concave portion provided in the outside thereof. In the present embodiment, the second surface 41 provided on the tip end of the convex portion 42 is a flat surface in which a direction including the first direction X and the second direction Y is set as an in-plane direction. By setting the tip end surface of the convex portion 42 as the second surface 41, the second surface 41 can be formed with high accuracy as compared with the case where the second surface 41 is provided over the entire the Z1 side of the second member 40. In particular, in a case of manufacturing by molding the second member 40, by providing the second surface 41 only on the tip end surface of the convex portion 42, surface accuracy of the second surface 41 can be improved. Therefore, it is possible to suppress the variations of the shape of the second flow path 202 formed by covering the concave portion 32 with the second surface 41 or the variations of the cross-section area. In such a manner, the second flow path 202 is formed such that the concave portion 32 of the first member 30 is covered with the second surface 41 of the second member 40. Accordingly, a second wall of the second member 40 defining the second flow path 202 according to the present embodiment means the second surface 41 (hereinafter, also referred to as a second wall 41).

In the transverse section of the second flow path 202, that is, a cross-section along the second direction Y, it is preferable that a width w1 of the second surface 41 is larger than a width w2 of the director 34, as will be described later in detail. That is, it is preferable that the width w1 of the second surface 41 in the second direction Y is larger than the width w2 including the concave portion 32 and the director 34 provided in the both side of the concave portion 32. Accordingly, it is possible to suppress weld defects caused by the positional deviation, and to suppress the reduction in the welded region caused by the positional deviation. Therefore, it is possible to firmly fix the first member 30 and the second member 40.

The first member 30 and the second member 40 are welded to each other by fusing a part of the director 34 in a state where the tip end surface of the director 34 of the first member 30 comes into contact with the second surface 41 of the second member 40, as will be described later in detail. The third member 50 is formed such that the part of the director 34 and the part of the second member 40 are melted, fed inside the concave portion 32, and cured. That is, the third member 50 includes materials both of the first member 30 and the second member 40. In particular, the third member 50 is formed by welding the director 34 which contacted with the second surface 41 and curing the fused director 34, mainly, the third member 50 is formed such that a part of the fused director 34 is mixed with a part of the second member 40 fused at the same time period of fusing the director 34. That is, the third member 50 is made of a material in which the transmittance with respect to the arbitrary wavelength, in the present embodiment, a wavelength of the fusing laser light is higher than that of the first member 30, and lower than that of the second member 40. That is, the second flow path 202 is defined by the first wall 33 of the first member 30 in which the transmittance with respect to the arbitrary wavelength is a first value, the second wall 41 of the second member 40 having a higher transmittance than the first value, and the third wall 51 which is formed by the third member 50 having a third value between the first value and the second value. By subjecting the director 34 to the fusing treatment in a state where the director 34 comes into contact with the second surface 41, the third member 50 is formed in a region where the director 34 and the second surface 41 face each other in the third direction Z. In addition, a part of the fused director 34 inside the concave portion 32 is introduced to an interface portion between the first wall 33 of the concave portion 32 and the second wall 41 and cured. That is, the third member 50 is provided inside the concave portion 32 on plan view from the third direction Z that is a lamination direction between the first member 30 and the second member 40. By the way, since a part of the director 34 is fused and cured to form the third member 50, a shape where a part of the proximal end portion side of the director 34 is remained is obtained. Also a shape where the director 34 is entirely fused and a part thereof is not remained may be used. In a case where the director 34 is entirely fused, since the first wall 33 of the concave portion 32 directly comes into contact with the second surface 41, the shape where the width of the cross section of the concave portion 32 becomes the largest at the opening portion as described above is used. Accordingly, an angle at which the first wall 33 of the concave portion 32 comes into contact with the second surface 41 and the second member 40 can be easily to 90 degrees or less. By setting an angle at which the first wall 33 of the concave portion 32 comes into contact with the second surface 41 to 90 degrees or less, and more preferably to an acute angle of less than 90 degrees, the fused director 34 can easily feed into the corner portion of the first wall 33 of the concave portion 32 and the second surface 41 by capillary force and can form the third member 50. In the present embodiment, by forming the concave portion 32 into a circular-shaped having an angle less than 180 degrees, an angle at which the first wall 33 of the concave portion 32 comes into contact with the second surface 41 can easily be the acute angle.

The third member 50 formed inside the concave portion 32 is provided in the interface portion between the first wall 33 and the second wall 41 which are inner surfaces of the concave portion 32 across the first wall 33 and the second wall 41. The interface portion between the first wall 33 and the second wall 41 means a portion of which the first wall 33 directly or indirectly continues with the second wall 41. In the present embodiment, since the first wall 33 and the second wall 41 are continuously connected via the wall surface 34a of the director 34, the first wall 33 and the second wall 41 are not directly continuously connected. Also by entirely fusing the director 34, the first wall 33 and the second wall 41 are directly continuously connected. The surface connecting the first wall 33 of the third member 50 and the second wall 41 becomes the third wall 51.

The third wall 51 of the third member 50 comes into contact with the first wall 33 and the second wall 41 at an angle larger than an angle θ1 of a portion of which the first wall 33 virtually comes into contact with the second wall 41. That is, in the present embodiment, an angle θ2 at which the third wall 51 comes into contact with the first wall 33 and the angle θ3 at which the third wall 51 comes into contact with the second wall 41 are angles larger than the angle θ1 of a portion of which the first wall 33 virtually comes into contact with the second wall 41. By the way, the angle θ1 of a portion of which the first wall 33 virtually comes into contact with the second wall 41 means that in the present embodiment, since the first wall 33 is not directly comes into contact with the second wall 41, an angle of the portion of which the first wall 33 is virtually extended and comes into contact with the second wall 41. Also in a case where the director 34 is entirely fused, since the first wall 33 comes into contact with the second wall 41, an angle θ1 of a portion the first wall 33 is virtually comes into contact with the second wall 41 includes an angle of a portion of which the first wall 33 comes into contact with the second wall 41. In the present embodiment, the transverse section of the concave portion 32 is provided into a circular-shaped concave having an angle less than 180 degrees, the angle θ1 the a portion of which the first wall 33 virtually comes into contact with the second wall 41 becomes an acute angle. In addition, as described above, by providing the wall surface 34a of the director 34 at the same position as that of the opening edge portion of the first surface 31 side of the concave portion 32 or provided so as to be inclined outside the position thereof, an angle of the portion at which the wall surface 34a of the director 34 comes into contact with the second wall 41 set to an angle of 90 degrees or less. In the present embodiment, the third wall 51 has a concave curved surface obtained by connecting the first wall 33 and the second wall 41. Here, the description that the third wall 51 has the concave curved surface means a shape having centers of curvature on the second flow path 202 side in relation to the third member 50. Also, the third wall 51 may be a flat surface. When curing the third member 50 according to the present embodiment by subjecting the director 34 to the fusing treatment, since shrinkage due to during of the resin occurs, the third wall 51 that is a surface thereof likely becomes the concave curved surface. It is preferable that the third wall 51 becomes the flat surface or the concave curved surface as described above. Accordingly, as compared to a case where the third wall 51 formed into a convex curbed surface, the third wall 51 can come into contact with the first wall 33 and the second wall 41, respectively, at the angles θ2 and θ3 larger than the angle θ1 of a portion of which the first wall 33 virtually comes into contact with the second wall 41. The second flow path 202 is defined by the first wall 33 of the first member 30, the second wall 41 of the second member 40, and the third wall 51 of the third member 50.

In the present embodiment, it is preferable that the thickness of the first member 30 on the first surface 31 in the third direction Z is larger than the thickness of the second member 40 in the second surface 41. According to this, it is possible to improve the energy efficiency when the director 34 is subjected to the fusing treatment with laser light which has passed through the second member 40. In a case where the thickness of the first member 30 on the first surface 31 in the third direction Z is larger than the thickness of the second member 40 on the second surface 41, it is preferable that the depth of the first member 30 side of the second flow path 202 in the third direction Z with respect to the interface between the first surface 31 and the second surface 41 is greater than the second member 40 side of the second flow path 202. That is, in Embodiment 1 described above, since the concave portion 32 is formed on the first member 30, and the second surface 41 that is the flat surface is provided on the second member 40, the depth of the second flow path 202 of the first member 30 means the depth of the concave portion 32 and the depth of the second flow path 202 of the second member 40 becomes zero (0). In this manner, by forming the second flow path 202 on the first member 30 deeper than the second member 40, the first member 30 and the second member 40 can be efficiently used.

Figure 5:
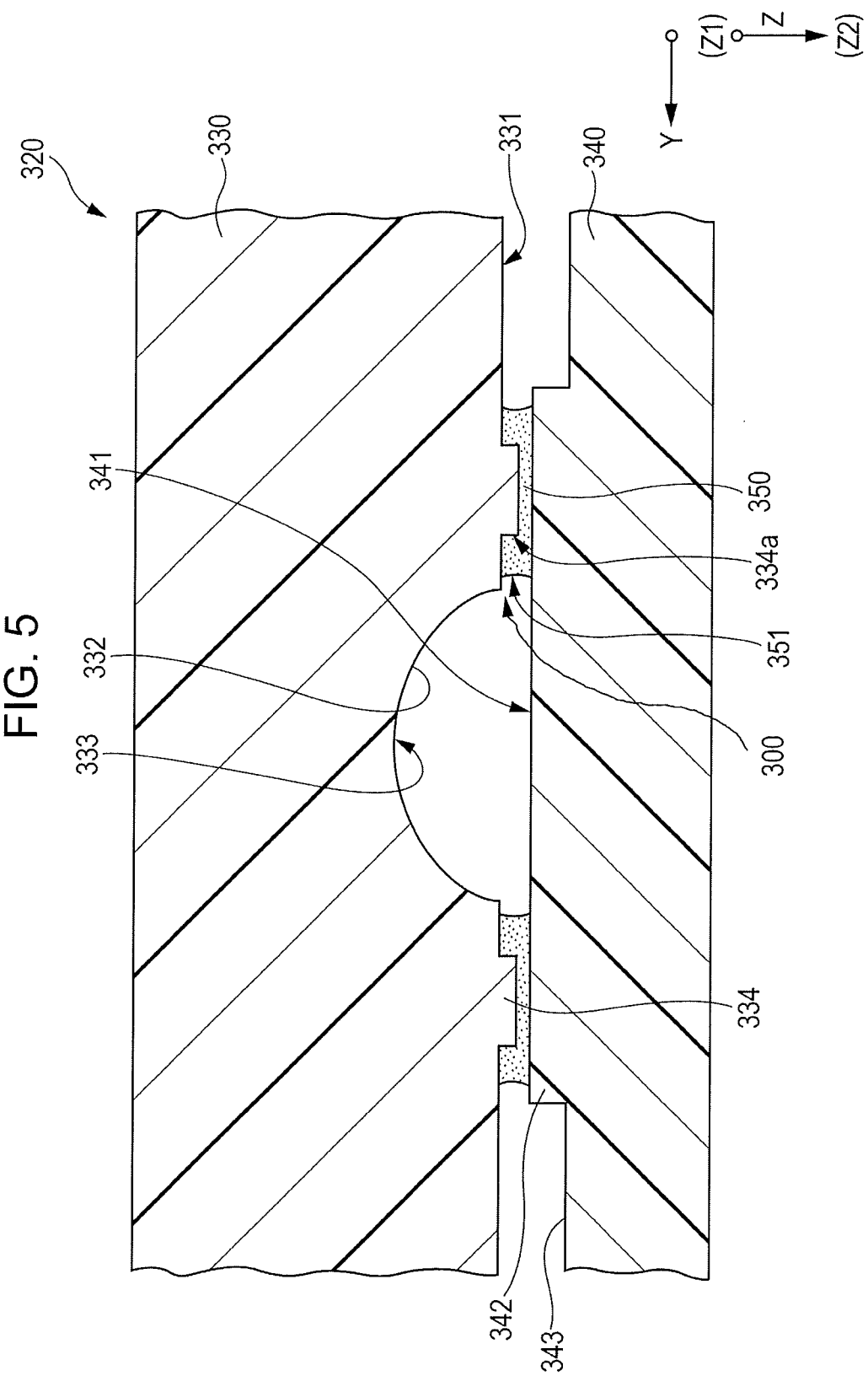
FIG. 5 is a sectional view of a comparative example of the flow path member according to Embodiment 1 of the invention.

Here, on plan view from the third direction Z for the comparison, the configuration in which the third member 50 is located outside the opening of the first surface 31 side of the concave portion 32 will be described with reference FIG. 5. FIG. 5 is a sectional view of an essential part of the flow path member to be compared.

As shown in FIG. 5, a director 334 provided on a first member 330 of a flow path member 320 to be compared is provided on a position apart from the outside the opening of a concave portion 332 in a first surface 331. By subjecting the director 334 to the fusing treatment in a state where the director 334 comes into contact with a second surface 341 of a second member 340, a space formed by the first surface 331, a wall surface 334a of the director 334, and the second surface 341 is filled with a part of the fused director 334, and cured. Accordingly, a third wall 351 of the third member 350 formed by the director 334 fused is provided coming into contact with the first surface 331 without a first wall 333. In such a configuration, it cannot be considered that the third member 350 is provided inside the concave portion 332 on plan view from the third direction Z. That is, in the invention of the present application, a space formed by the wall surface 334a of the director 334 in which the third member 350 is provided, the first surface 331, and the second surface 341 is not included in the concave portion 332. In addition, it cannot be considered that the third wall 351 comes into contact with the first wall 33 that is an inner side of the concave portion 332. That is, as Embodiment 1 described above, the description that the third wall 51 comes into contact with the first wall 33 and the second wall 41 means that the third wall 51 directly comes into contact with the first wall 33 and the second wall 41. In such a configuration shown in FIG. 5, in the wall surface of the second flow path 202, a recess 300 which is formed by the first wall 333, the first surface 331, the second surface 341, and the third wall 351 is formed. In the recess 300, since the ink flow is stagnated, the air bubbles are retained in the recess 300, the retained air bubbles is grown, and the grown air bubble is introduced to the head main body 10 at unexpected timing. Therefore, ink ejection failure occurs. In addition, in a case where a filter for removing the air bubbles or the foreign objects included in the ink is provided between the head main body 10 and the flow path member 320, by covering the filter to the grown air bubbles, an effective region of the filter is reduced, pressure loss is increased, or the pressure exceeds a meniscus pressure resistance. Therefore, failure such as generating the air bubbles from the nozzle opening 121 occurs.

With respect to this, in the present embodiment, the third member 50 is provided inside the concave portion 32 on plan view from the third direction Z. In addition, the third wall 51 comes into contact with the first wall 33 and the second wall 41, respectively, at the angles θ2 and θ3 larger than the angle θ1 of a portion of which the first wall 33 virtually comes into contact with the second wall 41. Accordingly, it is possible to suppress the formation of the recess 300 on the wall surface of the second flow path 202. That is, by introducing the fused director 34 inside the concave portion 32, the portion of which the ink flow of the second flow path 202 (concave portion 32) is reduced by the fused director 34. It is possible to suppress the problems caused by recess 300 such as ink ejection failure, increases in pressure loss, and generating the air bubbles from the nozzle opening 121.

In addition, in the present embodiment, it is possible to form the director 34 such that the width of the director 34 in the second direction Y is larger than that of the director 334 shown in FIG. 5. That is, in a case where the director 334 shown in FIG. 5 is formed at the same width as that of the director 34 shown in FIG. 4, since it is necessary to form the director 334 in a position apart from the concave portion 332, the size of the flow path member 20 becomes larger. Therefore, it is required to reduce the width of the director 334 as compared to the width of the director 34. By reducing the width of the director 334, the welding strength between the first member 330 and the second member 340 becomes deteriorated. That is, in the present embodiment, the director 34 having a larger width can be formed without increasing the size of the flow path member 20 compared to the director 334. By increasing the welding area between the first member 30 and the second member 40, the both can be firmly fixed. In the present embodiment, the fused director 34 is introduced outside the director 34 as the same manner in the side facing the concave portion 32 and is cured. That is, the third member 50 welding the first member 30 and the second member 40 extends from the portion of which the director 34 relatively faces the second surface 41 to the inside and the outside the concave portion 32. Accordingly, by increasing the welding area between the first member 30 and the second member 40, the both can be firmly fixed.

Figure 6:
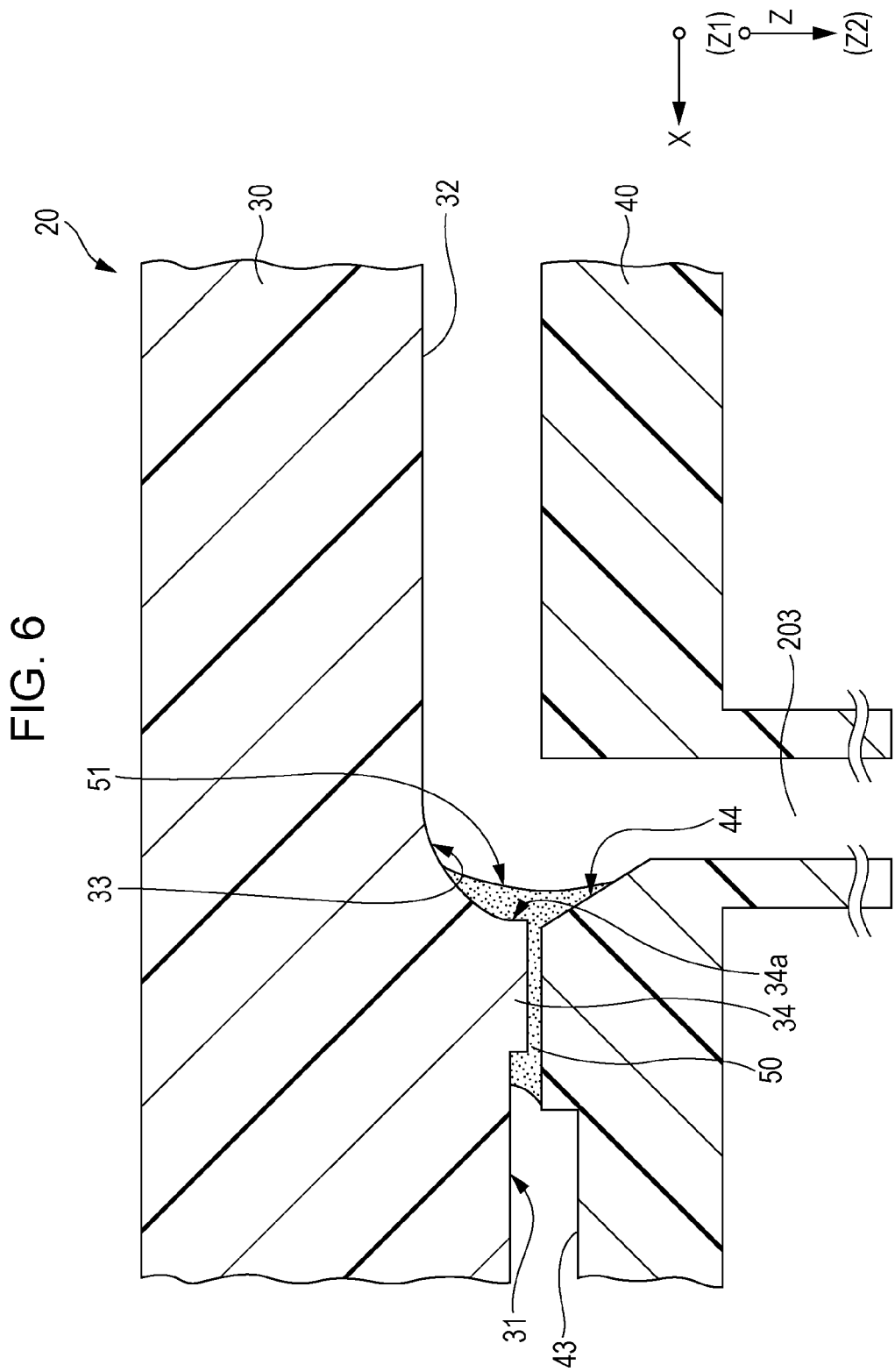
FIG. 6 is an enlarged sectional view of an essential part of the flow path member according to Embodiment 1 of the invention.

In addition, in the present embodiment, the second flow path 202 is communicated with the third flow path 203, respectively, in the both end portion. Here, the end portion of the second flow path 202 will be described with reference to FIG. 6. FIG. 6 is an enlarged sectional view of an essential part of FIG. 3.

As shown in FIG. 6, a height of the concave portion 32 of the first member 30 in the third direction Z continue gradually decreasing toward the end portion in the first direction X, that is, a direction of the ink flow.

In addition, in the cross-section along the first direction X, the third flow path 203 of the second member 40 includes a tapered surface 44 inclined such that the width of the opening increases toward the first wall 33. By the fused director 34, the third member 50 is formed in the interface portion between the first wall of the concave portion 32 and the tapered surface 44 of the second member 40 across the first wall 33 and the tapered surface 44. That is, the third wall 51 of the third member 50 is provided such that the first wall 33 is continuous with the tapered surface 44. Such a third wall 51 is formed serves as the concave curved surface. In this manner, the tapered surface 44 is formed in the third flow path 203, and the third member 50 is provided in the corner portion formed by the tapered surface 44 and the first wall 33, thereby it is possible to suppress the portion of which the ink is stagnated, in a portion of which the ink flow between the second flow path 202 and the third flow path 203 is changed.

In such a flow path member 20, by using a material having higher transmittance of the second member 40 with respect to the arbitrary wavelength, for example, the wavelength of visible light than the transmittance of the first member 30 which having the same wavelength, it is possible to confirm the welding portion from the second member 40, that is, the third member 50, by visual recognition. In addition, since the transmittance of the third member 50 formed by welding is higher than that of the first member 30 and is lower than that of the second member 40, the third member 50 can be easily recognized by visual recognition via the second member 40. Accordingly, the welding state of the flow path member 20 can be easily confirmed, the flow path member 20 with high reliability can be obtained while suppressing the leakage of the ink from the welding surface, the decrease in the welding strength.

Figure 7:
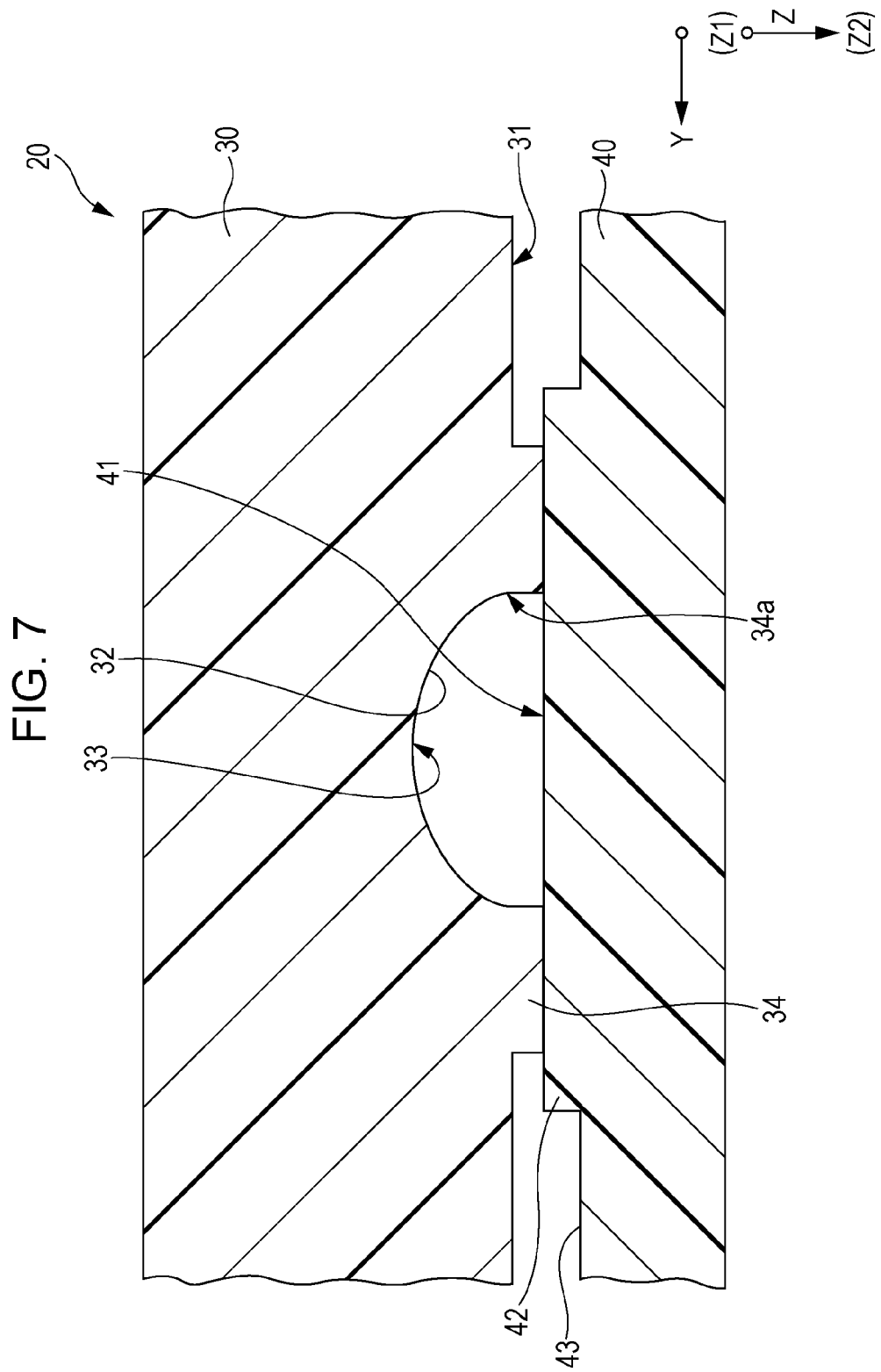
FIG. 7 is a sectional view illustrating a method of manufacturing the flow path member according to Embodiment 1 of the invention.
Figure 8:
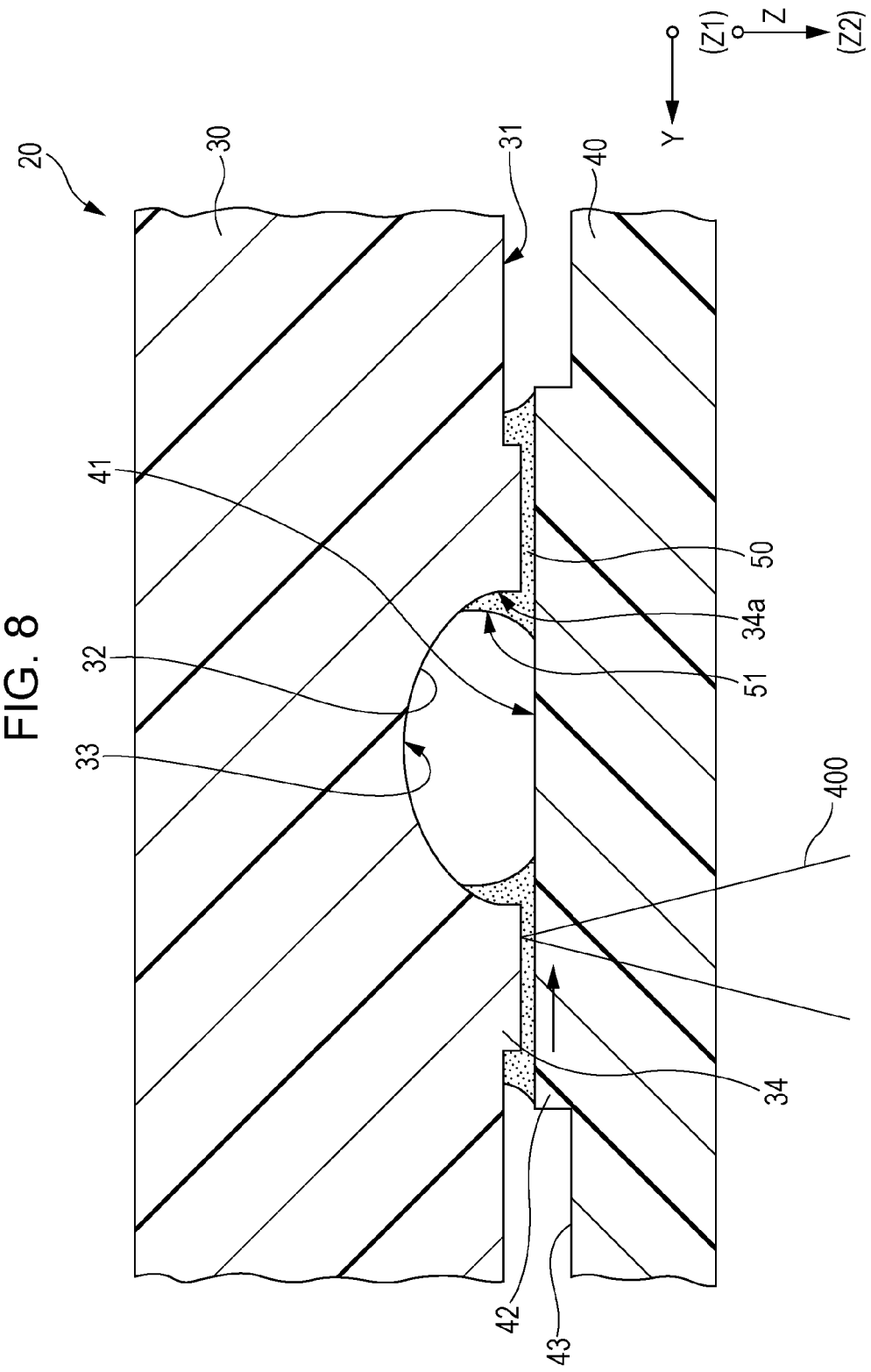
FIG. 8 is a sectional view illustrating the method of manufacturing the flow path member according to Embodiment 1 of the invention.
Figure 9:
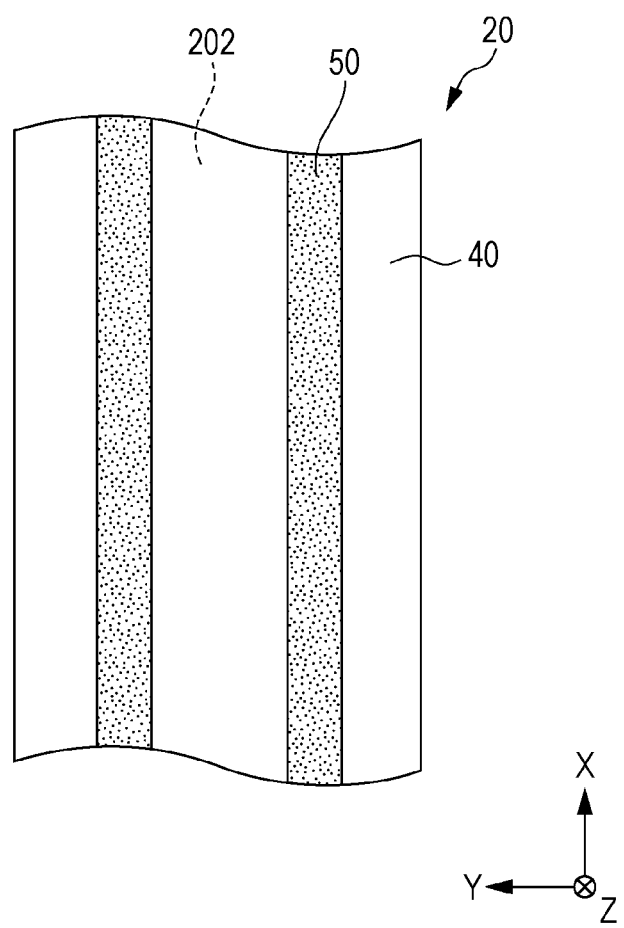
FIG. 9 is a bottom view illustrating the method of manufacturing the flow path member according to Embodiment 1 of the invention.

Here, a method of manufacturing the flow path member will be described with reference to FIGS. 7 to 9. FIGS. 7 and 8 are sectional views illustrating an essential part of the method of manufacturing the flow path member, and FIG. 9 is a bottom view of the flow path member from the second member side.

As shown in FIG. 7, the director 34 of the first member 30 comes into contact with the second surface 41 of the second member 40.

Here, the concave portion 32 which opens to the first surface 31 that is a surface of the Z2 side is provided on the first member 30. It is preferable that the concave portion 32 has a shape where the width thereof becomes the largest at the opening portion in a cross-section viewed from the direction perpendicular to the third direction Z that is a laminating direction of the first member 30 and the second member 40, that is, in the present embodiment, a cross-section extended in the second direction Y. Here, the shape where the width of the cross section of the concave portion 32 becomes the largest at the opening portion means that in the cross-section, the width of the opening in the first surface 31 is provided while maintaining the same width or at a width continue gradually decreasing toward the first surface 31 from the second surface 41, that is, toward the Z1 in the third direction Z. On the other words, the shape where the width of the cross-section of the concave portion 32 becomes the largest at the opening portion means a shape that the width of the transverse section of the concave portion 32 does not continue gradually decreasing from the Z2 toward the Z1. That is, the shape where the width of the cross-section of the concave portion 32 becomes the largest at the opening portion includes a shape where the width of the transverse section of the concave portion 32 is maintained in the same width over the third direction Z, and a shape where the width is gradually decreasing from the Z2 toward the Z1. As such a shape of the transverse section of the concave portion 32, for example, a substantially semi-circular shape, a substantially semi-ellipsoid shape, a substantially trapezoidal shape, a substantially triangle shape, and a substantially quadrilateral shape are included. Also, if the shape of the concave portion 32 is a shape where the width of the opening portion of the first surface 31 in the transverse section is the largest, the shape thereof is not limited to the above-mentioned shapes. In the present embodiment, a circular-shaped concave portion 32 with an angle of the transverse section of less than 180 degrees is formed. In this manner, by providing the shape in which the width of the transverse section of the concave portion 32 becomes the largest at the opening portion, the angle of the first wall 33 that is an inner surface of the concave portion 32 and the first surface 31 can be equal to or less than 270 degrees. Accordingly, the first member 30 having the concave portion 32 can be easily and inexpensively manufactured by molding the first member 30.

In addition, in the first member 30, the continuous directors 34 are provided over the range of the opening of the concave portion 32 of the first surface 31. The directors 34 are provided so as to protrude from the first surface 31 toward the Z2 side. The directors 34 according to the present embodiment are provided integrally continuous from the first member 30. The director 34 includes the wall surface 34a which is flush with the first surface 31 of the concave portion 32. In the present embodiment, the wall surface 34a of the director 34 is provided along a normal direction with respect to the first surface 31, that is, along the third direction Z. Accordingly, an angle of the portion in which the director 34a comes into contact with the second surface 41 is 90 degrees. The wall surface 34a also may be formed into an inclined surface which is inclined such that the opening side is extended with respect to the second surface 41. In addition, the wall surface 34a may be formed in a curved surface, in particular, a concave curved surface. By the way, the wall surface 34a of the director 34 may be provided so as to protrude inside the concave portion 32. However, the first member 30 which integrally have the directors 34 cannot be formed by molding the first member 30. That is, by providing the wall surface 34a of the director 34 at the same position as that of the opening edge portion of the first surface 31 side of the concave portion 32 or providing the wall surface 34a so as to be inclined such that the opening is extended outside the position, the first member 30 can be inexpensively manufactured with high accuracy by molding the first member 30. In addition, by providing the wall surface 34a of the director 34 at the same position as that of the opening edge portion of the first surface 31 side of the concave portion 32 or providing the wall surface 34a so as to be inclined such that the opening is extended outside the position, when the director 34 comes into contact with the second surface 41, the second surface 41 and the wall surface 34a can be disposed at an angle of 90 degrees or less. Accordingly, in the subsequent process, the fused director 34 can easily feed into the corner portion of the wall surface 34a of the director 34 and the second surface 41 by capillary force.

The second member 40 includes the second surface 41 with which the above-described director 34 comes into contact. The second surface according to the present embodiment is provided in a tip end surface of the convex portion 42 projecting to the first member 30 side. In the present embodiment, the second surface 41 provided on the tip end of the convex portion 42 is a flat surface in which a direction including the first direction X and the second direction Y is set as an in-plane direction. By setting the tip end surface of the convex portion 42 as the second surface 41, the second surface 41 can be formed with high accuracy as compared with the case where the second surface 41 is provided over the entire the Z1 side of the second member 40. In particular, in a case of manufacturing by molding the second member 40, by providing the second surface 41 only on the tip end surface of the convex portion 42, surface accuracy of the second surface 41 can be improved. Therefore, it is possible to suppress the variations of the shape of the second flow path 202 formed by covering the concave portion 32 with the second surface 41 or the variations of the cross-section area.

Figure 10:
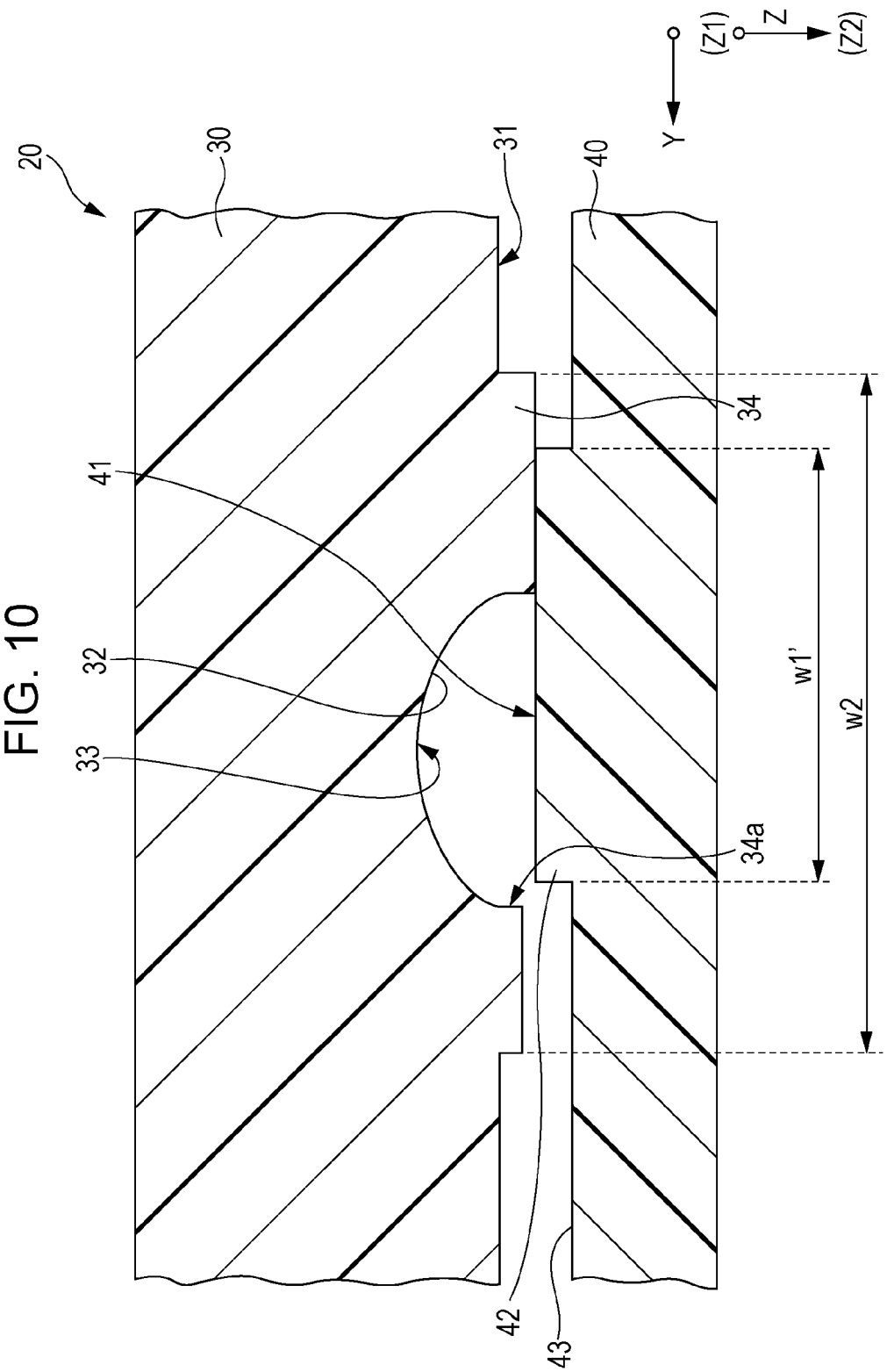
FIG. 10 is a sectional view of the comparative example of the flow path member according to Embodiment 1 of the invention.

In addition, as shown in FIG. 4, in the transverse section of the second flow path 202, that is, a cross-section along the second direction Y, it is preferable that a width w1 of the second surface 41 is larger than a width w2 of the director 34, as will be described later in detail. That is, it is preferable that the width w1 of the second surface 41 in the second direction Y is larger than the width w2 including the concave portion 32 and the director 34 provided in the both side of the concave portion 32. For example, as shown in FIG. 10, when a width w1' of the second surface 41 is set to be smaller than a width w2 including the concave portion 32 and the director 34 provided on the both sides of the concave portion 32, it is difficult to position between the director 34 and the second surface 41. It is difficult to weld the director 34 and the second surface 41 firmly due to the positional deviation. That is, the variations occur on the welding area between the director 34 and the second surface 41 due to the positional deviation, and the variations occur in the welding strength. In the present embodiment, by increasing the width w1 of the second surface 41 than the width w2 of the tip end surface of the director 34, positioning between the director 34 and the second surface 41 can be easily performed. Even when the positional deviation occurs in the director 34 in the second direction Y that is the width direction with respect to the second surface 41, the director 34 and the second surface 41 can reliably be constantly welded in the constant area in the subsequent process, and it is possible to suppress the occurrence of the variations in the welding strength. Therefore, it is possible to suppress the ink leakage from the welding portion or the breakage due to the shortage in the welding strength.

In addition, the first member 30 and the second member 40 configuring the flow path member 20 are formed of, for example, a resin material such as polypropylene. In the present embodiment, it is preferable that the transmittance of the second member 40 with respect to the arbitrary wavelength is set to be larger than the transmittance of the first member 30 with respect to the same wavelength. By increasing the transmittance with respect to the arbitrary wavelength of the second member 40 as compared to the first member 30, in the subsequent process, the welding portion between the first member 30 and the second member 40, that is, an introducing portion of the fused director 34 can be confirmed nondestructively via the second member 40, and the reliability may be improved. That is, in a case where the welding portion is confirmed in a visual manner in the inspection process, the arbitrary wavelength is a wavelength of the visible light. Also, the arbitrary wavelength is not limited to the wavelength of the visible light, for example, in a case where the inspection process is performed by an infrared camera, the arbitrary wavelength is a wavelength of an infrared light beam. A material which relatively high transmittance with respect to the arbitrary wavelength may be used in the both first member 30 and the second member 40. According to this, the welding portion can be confirmed from the both sides in the third direction Z, and the inspection process can be reliably performed. However, in a case where the material having relatively high transmittance with respect to the arbitrary wavelength is used for the both the first member 30 and the second member 40, since the laser light passes the both the first member 30 and the second member 40, the welding with the laser light cannot be efficiently performed. Therefore, in a case where the material having relatively high transmittance with respect to the arbitrary wavelength is used for the both the first member 30 and the second member 40, for example, welding of the first member 30 and the second member 40 may be performed by ultrasonic welding or the like. In a case where the welding of the first member 30 and the second member 40 by the ultrasonic welding, a material having the relatively high transmittance with respect to the arbitrary wavelength common with the first member 30 and the second member 40, in a case where the inspection process is not performed.

Furthermore, in a case of welding the director 34 by laser irradiation, and subjecting the first member 30 and the second member 40 to the fusing treatment in the subsequent process, the arbitrary wavelength defining the transmittance is a wavelength of the laser light. That is, when the transmittance of the second member 40 with respect to the laser light increases compared to the transmittance of the first member 30, the director 34 is efficiently subjected to the fusing treatment by irradiating the second member 40 side with the laser light and by irradiating the director 34 of the first member 30 with the laser light which has passed through the second member 40. In a case where the material having higher transmittance with respect to the laser light compared to the first member 30 is used in the second member 40, it is preferable that the thickness of the first member 30 on the first surface 31 in the third direction Z is larger than the thickness of the second member 40 in the second surface 41. According to this, it is possible to improve the energy efficiency when the director 34 is subjected to the fusing treatment with laser light which has passed through the second member 40. In a case where the thickness of the first member 30 on the first surface 31 in the third direction Z is larger than the thickness of the second member 40 on the second surface 41, it is preferable that the depth of the first member 30 side of the second flow path 202 in the third direction Z with respect to the interface between the first surface 31 and the second surface 41 is greater than the second member 40 side of the second flow path 202. That is, in the present embodiment described above, since the concave portion 32 is formed on the first member 30, and the second surface 41 that is the flat surface is provided on the second member 40, the depth of the second flow path 202 of the first member 30 corresponds to the depth of the concave portion 32 and the depth of the second flow path 202 of the second member 40 becomes zero (0). In this manner, by forming the second flow path 202 on the first member 30 deeper than the second member 40, the first member 30 and the second member 40 can be efficiently used.

In the present embodiment, a material having the higher transmittance of the second member 40 with respect to the laser light to be used in the subsequent process than the transmittance of the first member 30 is used. By the way, the wavelength of the laser light to be used in the subsequent process includes a range of the visible light wavelength. Therefore, in the flow path member 20 according to the present embodiment, the welding portion can be inspected in the visual manner from the second member 40 side, even in the next inspection process.

Next, as shown in FIG. 8, the director 34 of the first member 30 is subjected to the fusing treatment and a part of the fused director 34 inside the concave portion 32 on plan view from the third direction Z that is a laminating direction of the first member 30 and the second member 40. In the present embodiment, by radiating laser light 400 from the second member 40 side and by radiating the laser light 400 which has passed through the second member 40 to the tip end surface of the director 34 relatively facing the second surface 41, a part of the tip end portion side of the director 34 in the region where the director 34 and the second surface 41 are relatively facing each other is subjected to the fusing treatment. In this time, the first member 30 comes into contact with the second member 40 by applying the voltage. Therefore, the fused director 34 is introduced into the concave portion 32 from between the director 34 and the second surface 41. In addition, in the present embodiment, since the director 34 includes the director 34a which is flush with the first wall 33 that is an inner surface of the concave portion 32, by subjecting a part of the director 34 to the fusing treatment, the part of the director 34 can reliably introduce to the inside the concave portion 32. In addition, the fused director 34 is introduced also outside that is a side opposite to the concave portion 32 of the director 34. Since in the present embodiment, the angle of the wall surface 34a of the director 34 and the second surface 41 is set as 90 degrees or less, the fused director 34 which is introduced into the concave portion 32 can be feed extending the corner portion by capillary force. In addition, in the present embodiment, the fused director 34 in the concave portion 32 is introduced to the interface portion between the first wall 33 and the second surface 41 so as to extend over the first wall 33 and the second wall 41. That is, if the introducing amount of the fused director 34 is small, the director 34 is introduced to only the corner portion between the wall surface 34a of the director 34 and the second surface 41. However, in the present embodiment, by adjusting the introducing amount thereof, the director 34 can be introduced so as to spread over the first wall 33 and the second wall 41. The introducing amount of the fused director 34 can be adjusted by, for example, the pressure pushing the director 34 to the second surface 41, and an amount required for fusing treatment of the director 34, that is, output of the laser light 400, or the like. By the way, the interface portion between the first wall 33 and the second surface 41 means a portion of which the first wall 33 directly or indirectly continues with the second surface 41. In the present embodiment, since the director 34 is not entirely fused, and only a part of the tip end side is fused, the first wall 33 continues with the second wall 41 via the wall surface 34a of the director 34. Accordingly, the first wall 33 not continues with the second wall 41 in a state where the first wall 33 directly comes into contact with the second surface 41. Also, in a case where the director 34 is entirely fused, the first wall 33 can be continued with the second wall 41 in a state where the first wall 33 directly comes into contact with the second surface 41.

By the way, when subjecting the director 34 to the fusing treatment, a part of the second member 40 is also fused by the heat at the same time. That is, the third member 50 formed by subjecting the director 34 to the fusing treatment and curing the fused director 34 in the subsequent process mainly includes the material forming the director 34 and the material forming the second member 40. In the present embodiment, since the transmittance with respect to the laser light 400 of the first member 30 is low, and the transmittance with respect to the laser light 400 of the second member 40 is higher than that of the first member 30, the transmittance with respect to the laser light 400 of the third member 50, which is formed by subjecting the director 34 to the fusing treatment and curing the fused director 34 in the subsequent process, is higher than that of the first member 30 and lower than that of the second member 40.

In the present embodiment, in the director 34, only the tip end portion which comes into contact with the second member 40 is subjected to the fusing treatment, and remained in the proximal end portion side, but it is not limited thereto. The director 34 may be entirely fused. In a case where the director 34 is entirely fused, the shape where the width of the cross section of the concave portion 32 becomes the largest at the opening portion, and the angle at which the first wall 33 that is an inner surface of the concave portion 32 comes into contact with the second surface 41 of the second member 40 can be set 90 degrees or less. By setting the angle at which the inner surface of the concave portion 32 comes into contact with the second surface 41 to 90 degrees or less, and in particular, to an acute angle of less than 90 degrees, the fused director 34 can easily feed into the corner portion of the first wall 33 of the concave portion 32 and the second surface 41 by capillary force. By setting the angle at which the first wall 33 of the concave portion 32 comes into contact with the second surface 41 to 90 degrees or less, the first member 30 having the concave portion 32 can be easily and inexpensively manufactured by molding the first member 30. In the present embodiment, by forming the concave portion 32 into a circular-shaped having an angle less than 180 degrees, the angle at which the first wall 33 of the concave portion 32 comes into contact with the second surface 41 can set to an acute angle.

Thereafter, by curing the fused director 34 in a state where the concave portion 32 is covered with the second surface 41, as shown in FIG. 4, the first member 30 is fixed, that is, welded with the second member 40. In addition, the third member 50 is formed by curing the fused director 34. The fused director 34 may be cured in placed at a normal temperature (room temperature) and may be cured by cooling to a temperature lower than the room temperature.

The third member 50 formed by cuing the fused director 34 is provided in the interface portion between the first wall 33 and the second surface 41 which are inner surfaces of the concave portion 32 across the first wall 33 and the second surface 41 (second wall 41) as described above. The surface connecting the first wall 33 of the third member 50 and the second wall 41 becomes the third wall 51.

The third wall 51 of the third member 50 comes into contact with the first wall 33 and the second wall 41 at an angle larger than an angle $\theta 1$ of a portion of which the first wall 33 virtually comes into contact with the second wall 41. That is, in the present embodiment, the angle $\theta 2$ of a portion of which the third wall 51 comes into contact with the first wall 33 and angle $\theta 3$ of a portion of which the third wall 51 comes into contact with the second wall 41 are an angle larger than the angle $\theta 1$ of a portion of which the first wall 33 virtually comes into contact with the second surface 41. By the way, the angle $\theta 1$ of a portion of which the first wall 33 virtually comes into contact with the second wall 41 means that in the present embodiment, since the first wall 33 is not directly comes into contact with the second wall 41, an angle of the portion of which the first wall 33 is virtually extended and comes into contact with the second wall 41. Also in a case where the director 34 is entirely fused, since the first wall 33 comes into contact with the second wall 41, an angle $\theta 1$ of a portion the first wall 33 is virtually comes into contact with the second wall 41 includes an angle of a portion of which the first wall 33 comes into contact with the second wall 41. In the present embodiment, the transverse section of the concave portion 32 is provided into a circular-shaped concave having an angle less than 180 degrees, the angle $\theta 1$ the a portion of which the first wall 33 virtually comes into contact with the second wall 41 becomes an acute angle. In addition, by providing the wall surface 34a of the director 34 at the same position as that of the opening edge portion of the first surface 31 side of the concave portion 32 or provided so as to be inclined outside the position thereof, an angle of the portion at which the wall surface 34a of the director 34 comes into contact with the second surface 41 set to an angle of 90 degrees or less. In the present embodiment, the third wall 51 has a concave curved surface obtained by connecting the first wall 33 and the second wall 41. Here, the description that the third wall 51 has the concave curved surface means a shape having centers of curvature on the second flow path 202 side in relation to the third member 50. Also, the third wall 51 may be a flat surface. When curing the third member 50 according to the present embodiment by subjecting the director 34 to the fusing treatment, since shrinkage due to during of the resin occurs, the third wall 51 that is a surface thereof likely becomes the concave curved surface. It is preferable that the third wall 51 becomes the flat surface or the concave curved surface as described above. Accordingly, as compared to a case where the third wall 51 formed into a convex curbed surface, the third wall 51 can come into contact with the first wall 33 and the second wall 41, respectively, at the angles $\theta 2$ and θ3 larger than the angle θ1 of a portion of which the first wall 33 virtually comes into contact with the second wall 41. The flow path member 20 having the second flow path 202 is formed by the first wall 33 of the first member 30, the second wall 41 of the second member 40, and the third wall 51 of the third member 50 which are formed as described above.

Thus, only by welding the first member 30 and the second member 40, the third member 50 is formed by introducing the fused director 34 into the concave portion 32 and curing the introduced director. Accordingly, it is possible to easily reduce a portion of which the ink flow of the second flow path 202 is stagnated. Therefore, it is possible to simplify the manufacturing process. By reducing a portion of which the ink flow of the second flow path 202 is stagnated, the retention of the air bubbles in a portion of which the ink is stagnated. Accordingly, it is possible to improve the air bubble dischargeability.

Thereafter, an inspection process for inspection of the welding portion between the first member 30 and the second member 40 is performed. In the present embodiment, since the transmittance of the second member 40 with respect to the wavelength of the visible light is higher than the transmittance of the first member 30 having the same wavelength, as shown in FIG. 9, the flow path member 20 can see through the second member 40 from the second member 40 at the Z2 side. Therefore, the welding portion, that is, the third member 50 can be confirmed nondestructively in a visual manner or by a camera. In particular, the width of the second wall 41 is smaller than the first wall 33 and thereby prevents the third wall 51 which comes into contact which the second wall 41 being misidentified as the first wall 33. That is since the third member 50 occupies a range while the width of the second wall 41 is smaller than the first wall 33, the third member 50 is easily confirmed from the second member 40 side. In addition, since the transmittance of the third member 50 formed by welding is higher than that of the first member 30, and lower than that of the second member 40, the third member 50 is easily confirmed via the second member 40. Accordingly, the introducing amount of the third member 50 to the concave portion 32 or the introducing amount of third member 50 to the outside the concave portion 32 can be confirmed nondestructively. The determination of the defective product can be easily performed, and it is possible to improve the reliability of the flow path member 20.

Embodiment 2

Figure 11:
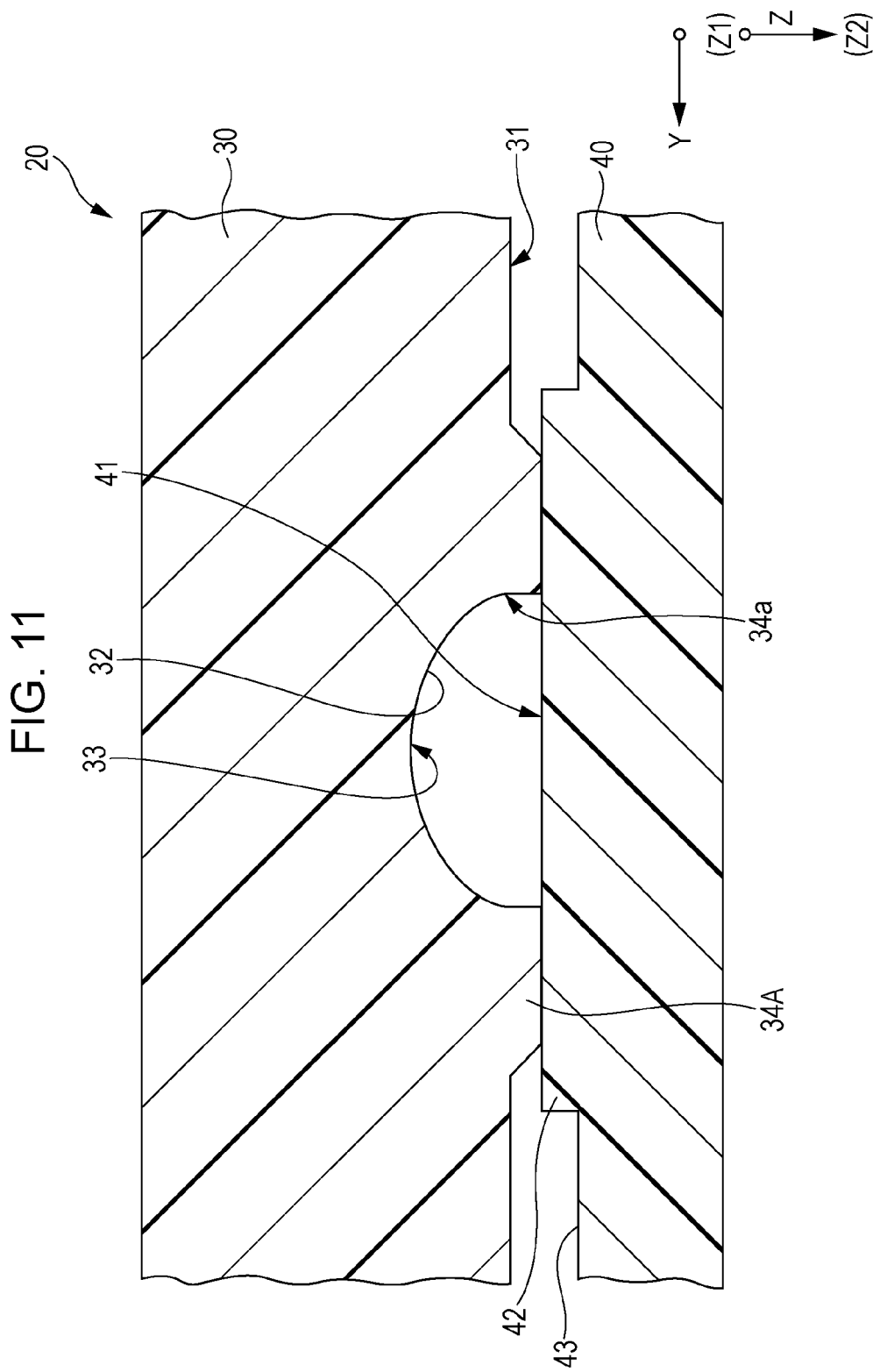
FIG. 11 is a sectional view illustrating a method of manufacturing a flow path member according to Embodiment 2 of the invention.
Figure 12:
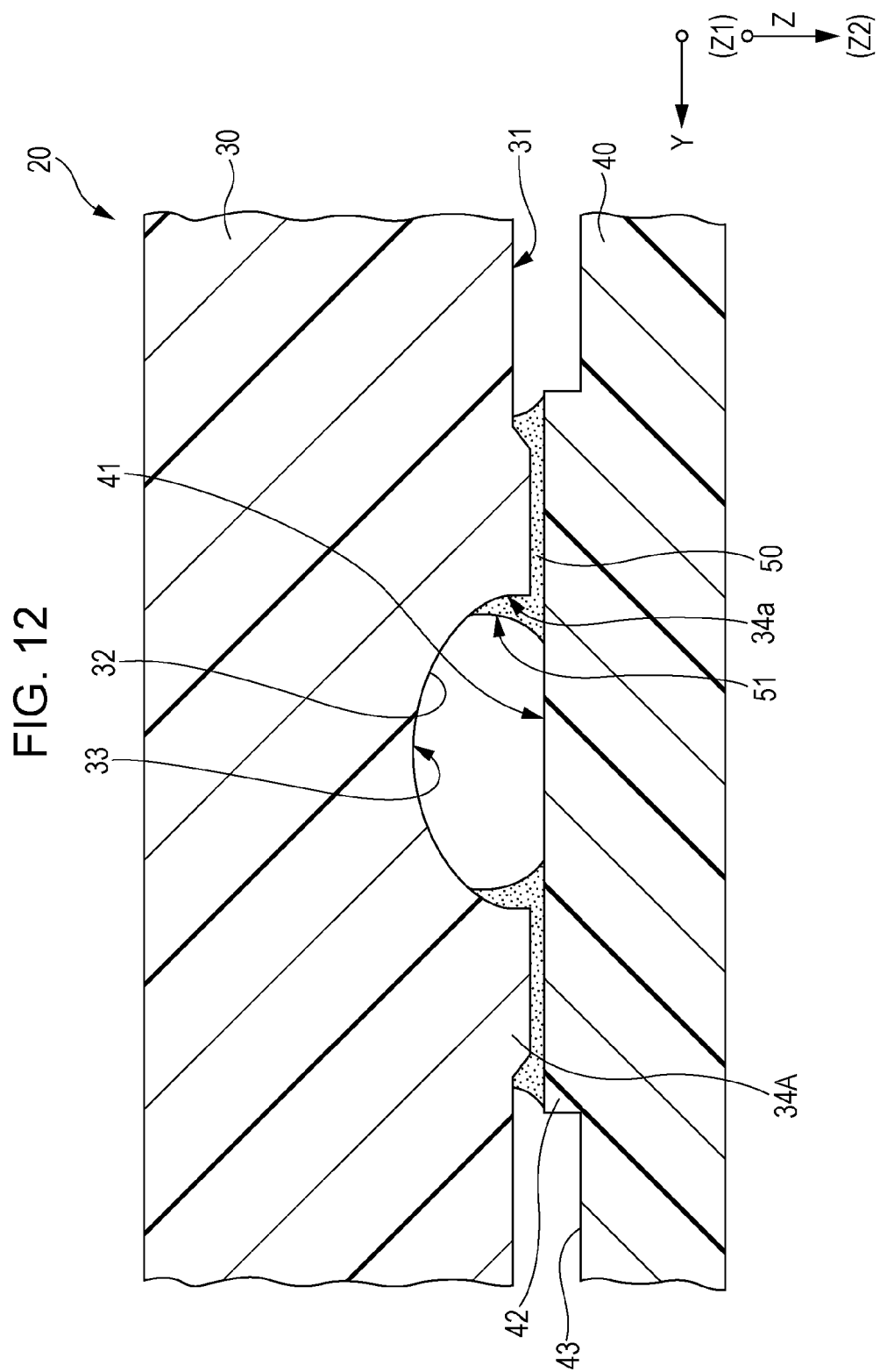
FIG. 12 is a sectional view illustrating the method of manufacturing the flow path member according to Embodiment 2 of the invention.

FIGS. 11 and 12 are sectional view illustrating a method of manufacturing a flow path member according to Embodiment 2 of the invention. The member that are the same as the above-described present embodiment are denoted by the same reference numerals, and are not described again here.

Firstly, as shown in FIG. 11, in the method of manufacturing the flow path member 20 according to the present embodiment, a director 34A of the first member 30 comes into contact with the second surface 41 of the second member 40.

The directors 34A before subjecting the fusing treatment are provided over the range of the opening of the concave portion 32. The directors 34A are provided so as to protrude from the first surface 31 toward the Z2 side. The director 34A has a shape in which the width of the director continues gradually decreasing from the first surface 31 toward the second surface 41 in the second direction Y.

In the present embodiment, the director 34A has the wall surface 34a which is flush with a first wall 33 that is an inner surface of the concave portion 32. The wall surface 34a is provided along the third direction Z, that is, a normal direction with respect to the first surface 31. Accordingly, the director 34A becomes an inclined surface in which the side facing the director 34A is inclined. By providing the width of the director 34A continue gradually decreasing toward the second member 40 side in such a manner, a load when the tip end surface of the director 34A comes into contact with the second surface 41 is easily concentrated and the director 34A can be reliably contacted to the second surface 41.

As shown in FIG. 12, by subjecting the tip end surface of the director 34A to the fusing treatment, the first member 30 is welded to the second member 40 and a part of the cured director 34A can be introduced into the concave portion 32.

Thereafter, by curing the director 34A cured, the first member 30 is fixed to the second member 40. In the present embodiment, by providing the width of the director 34A continue gradually decreasing toward the second member 40 side in such a manner, a load when the tip end surface of the director 34A comes into contact with the second surface 41 is easily concentrated and the director 34A can be reliably contacted to the second surface 41. Therefore, the first member 30 can be firmly fixed to the second member 40 by the fused director 34A.

In the present embodiment, as shown in FIG. 12, regarding also the remained director 34A after subjecting to the fusing treatment, the shape is set as a shape in which the width of the director 34A continue gradually decreasing toward the second member 40. However, the shape is not limited thereto. For example, when welding the first member 30 and the second member 40, a portion of which the width of the director 34A continue gradually decreasing toward the second member 40 is fused and may be destroyed.

Embodiment 3

Figure 13:
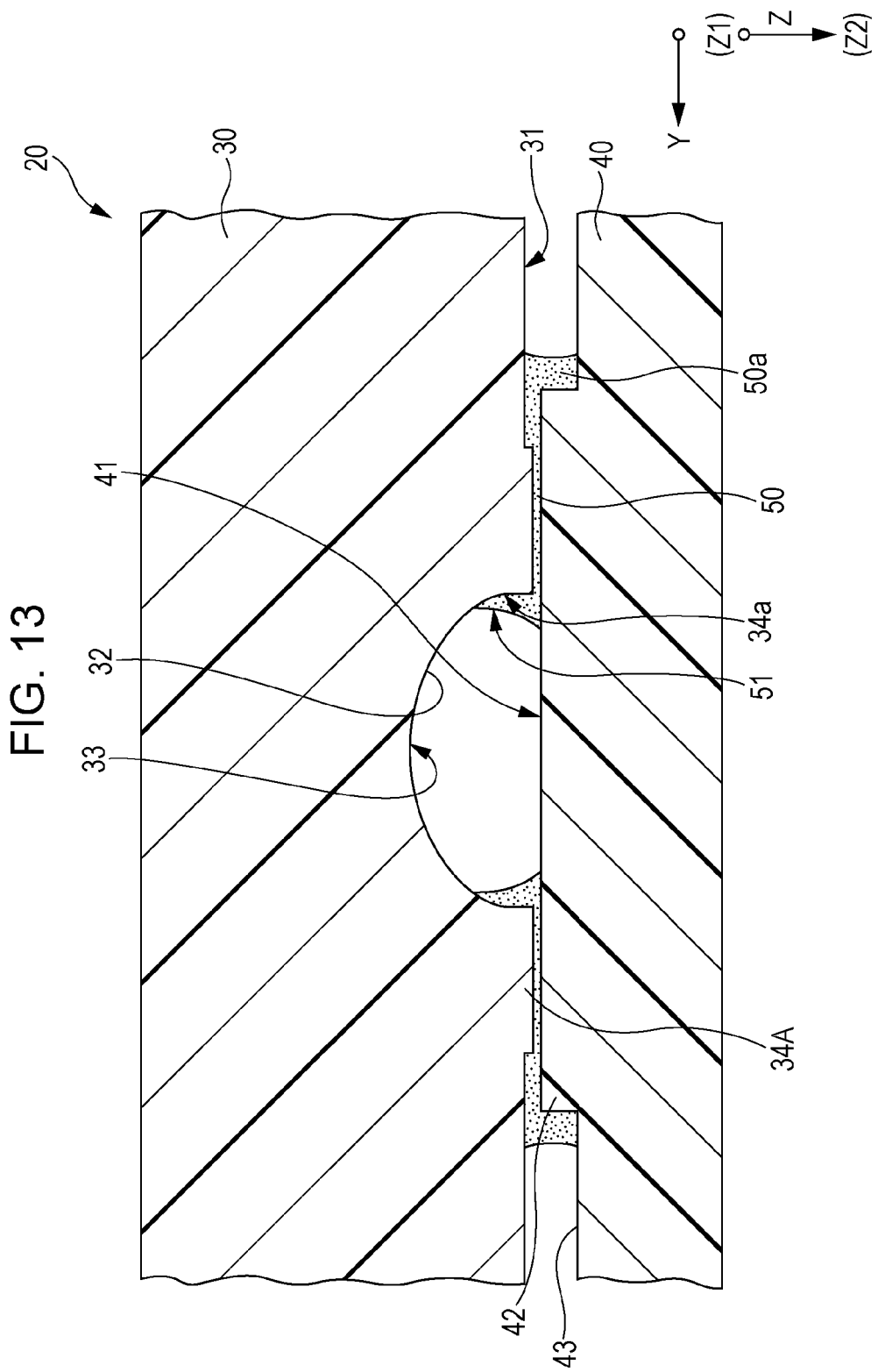
FIG. 13 is a sectional view illustrating a flow path member according to Embodiment 3 of the invention.

FIG. 13 is a sectional view illustrating an essential part of a flow path member according to Embodiment 3 of the invention. The member that are the same as the above-described present embodiment are denoted by the same reference numerals, and are not described again here.

As shown in FIG. 13, in the present embodiment, the fused director 34 is introduced into the step portion 43, and the director 34 causes the second member 40 to weld with the first member 30, even in the step portion 43. Even in the step portion 43, by welding the first member 30 and the second member 40 and thereby the welding area between the first member 30 and the second member 40 increases. Accordingly, the both are firmly fixed to each other. The third members 50 is provided continuously from the second surface 41 into the step portion 43. Therefore, the third members 50 are also provided on the step portion between the convex portion 42 and the step portion 43. Accordingly, it is possible to improve the fixing strength between the first member 30 and the second member 40 by the anchor effect.

Embodiment 4

Figure 14:
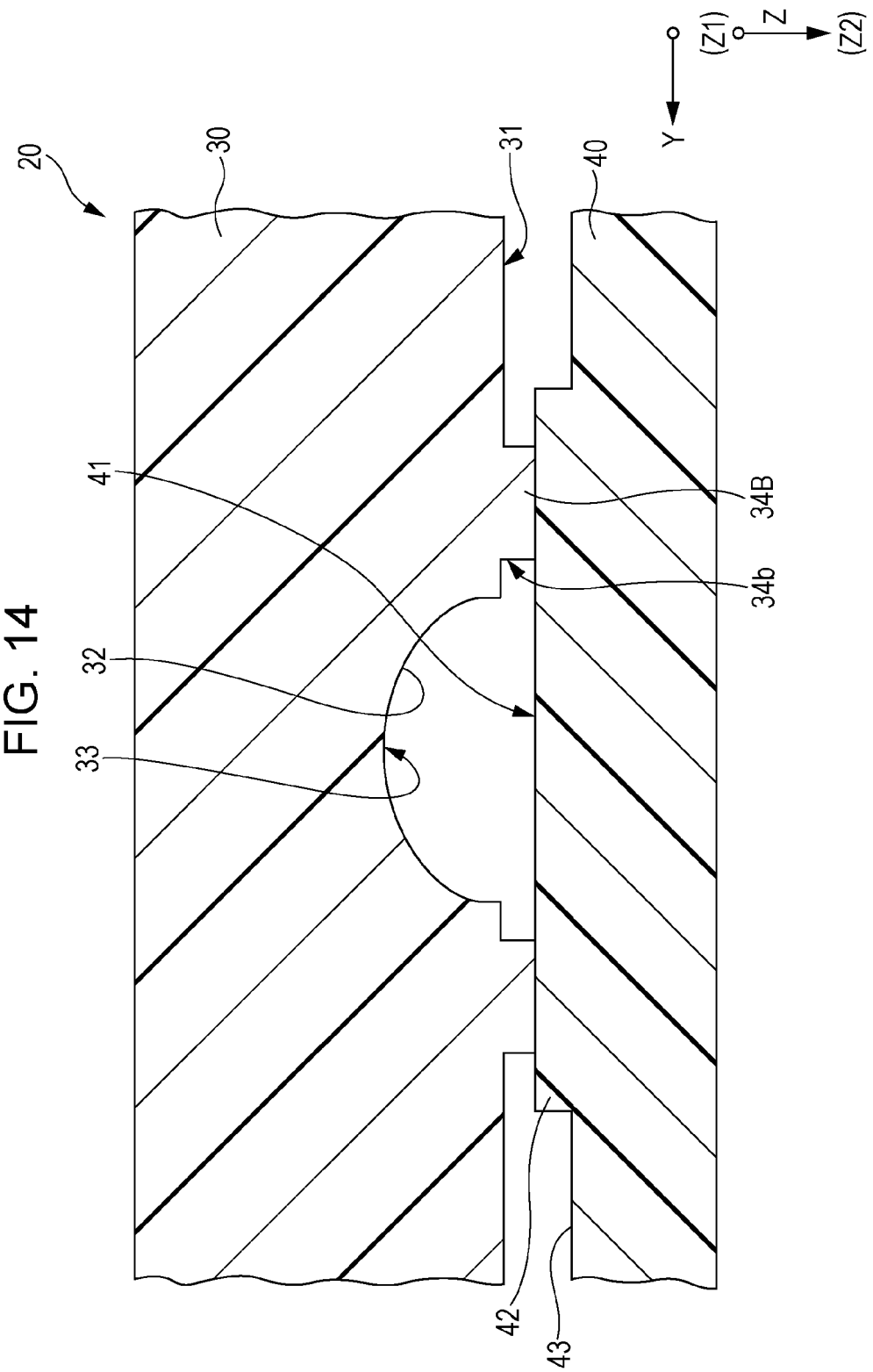
FIG. 14 is a sectional view illustrating a method of manufacturing a flow path member according to Embodiment 4 of the invention.
Figure 15:
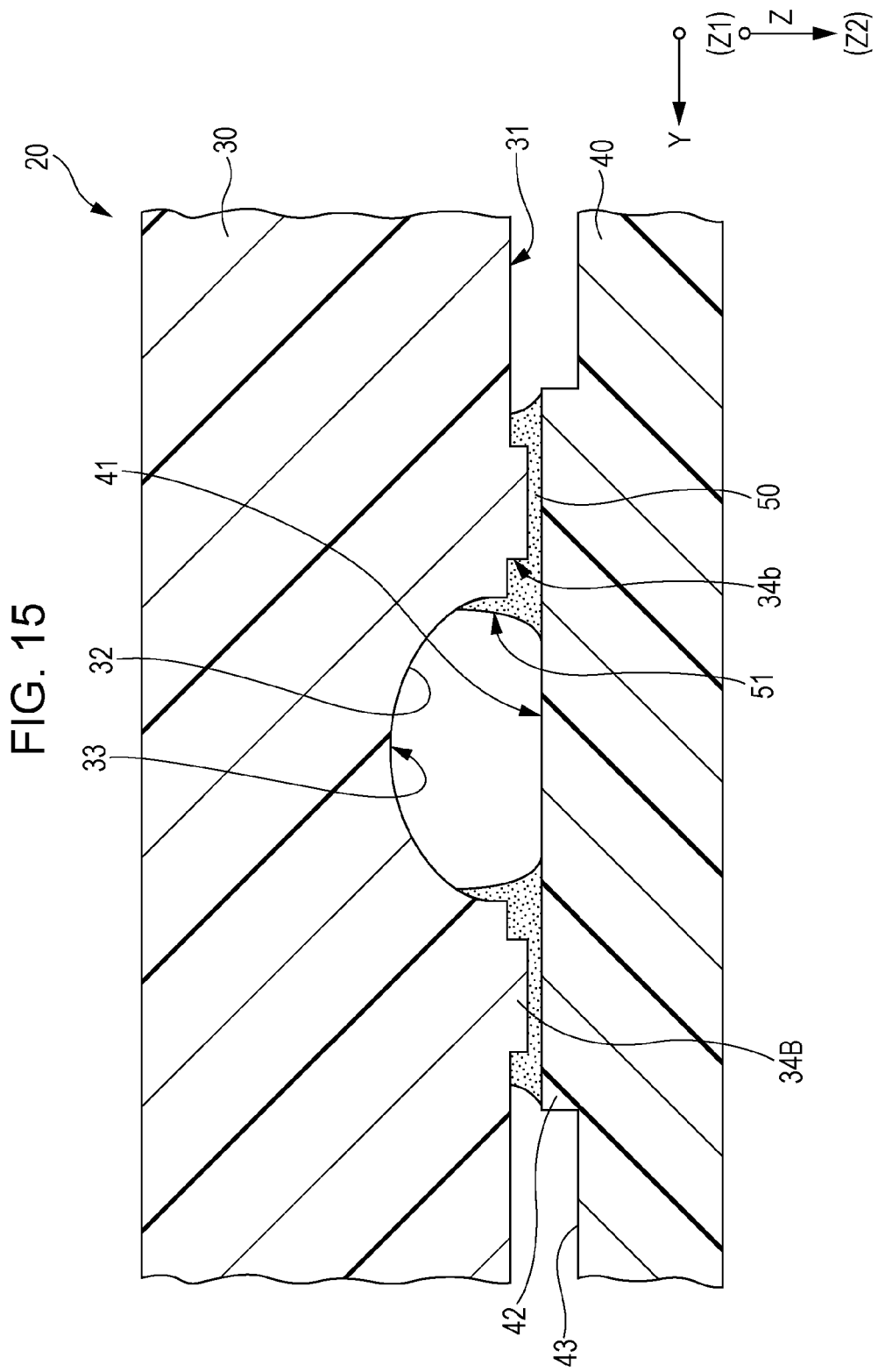
FIG. 15 is a sectional view illustrating the method of manufacturing the flow path member according to Embodiment 4 of the invention.

FIGS. 14 and 15 are sectional view illustrating a method of manufacturing a flow path member according to Embodiment 4 of the invention. The member that are the same as the above-described present embodiment are denoted by the same reference numerals, and are not described again here.

Firstly, as shown in FIG. 14, in the method of manufacturing the flow path member 20 of the present embodiment, a director 34B of the first member 30 comes into contact with the second surface 41 of the second member 40.

The director 34B according to the present embodiment has the wall surface 34b outside the first wall 33 that is an inner surface of the concave portion 32. The wall surface 34b is provided along the third direction Z, that is, a normal direction with respect to the first surface 31. That is, between the first member 30 and the second member 40, a space is formed by the first surface 31, the second surface 41, and the wall surface 34b of the director 34B.

Next, as shown in FIG. 15, the director 34B is subjected to the fusing treatment, and is introduced into the concave portion 32. In this time, the space formed by the first surface 31, the second surface 41, and the wall surface 34b of the director 34B is filled with the director 34B fused, and the director 34B is further introduced inside the concave portion 32.

Thereafter, by curing the director 34B fused, the first member 30 is fixed to the second member 40. According to this, the third member 50 including the third wall 51 same as Embodiment 1 described above can be formed.

That is, even in a case where a wall surface 34b does not flush with the first wall 33 of the concave portion 32 such as a director 34B, by introducing the director 34B inside the concave portion 32, it is possible to suppress the formation of the recess 300 shown in FIG. 5.

Embodiment 5

Figure 16:
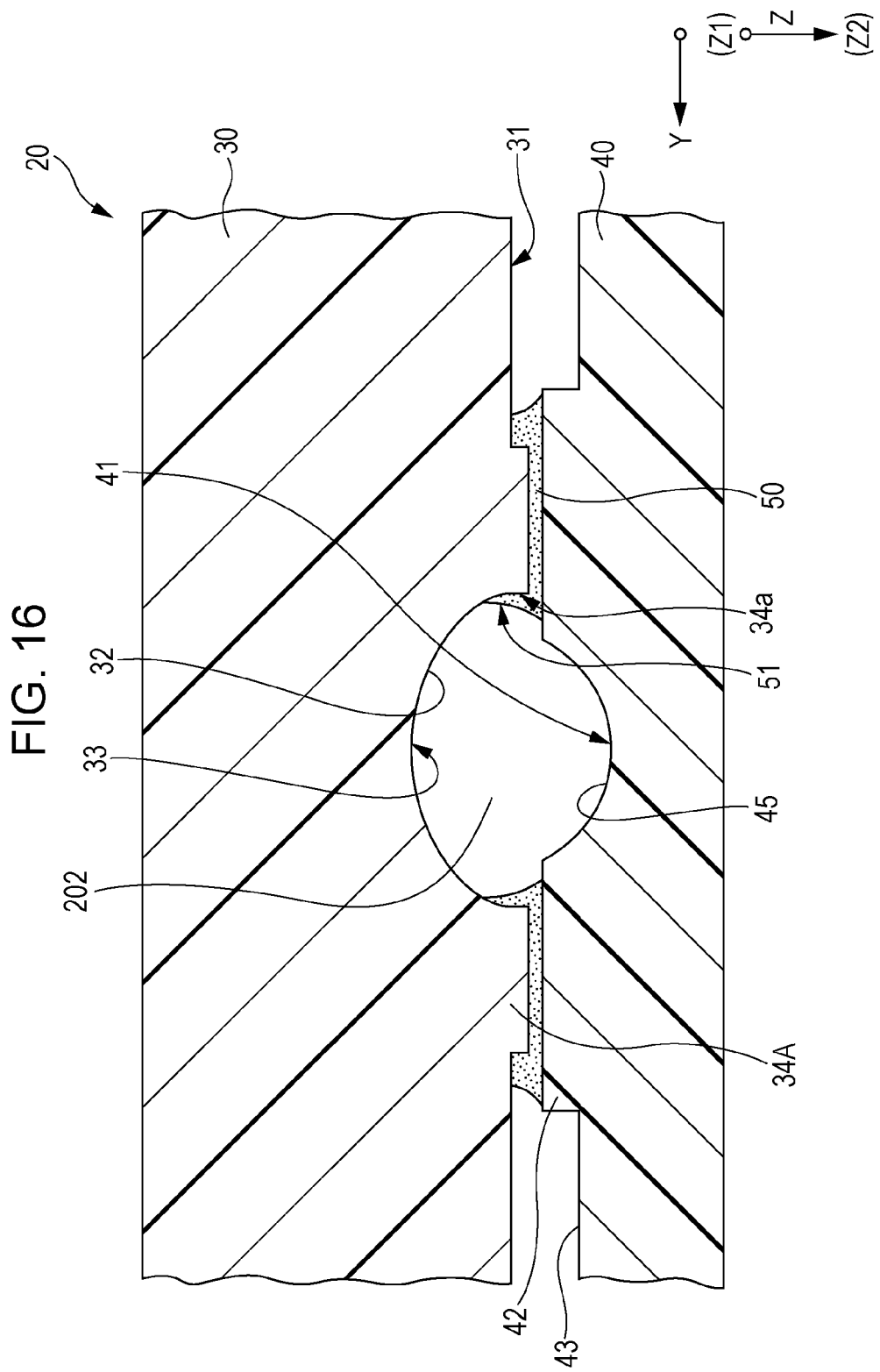
FIG. 16 is a sectional view of a flow path member according to Embodiment 5 of the invention.

FIG. 16 is a sectional view illustrating an essential part of a flow path member according to Embodiment 5 of the invention. The member that are the same as the above-described present embodiment are denoted by the same reference numerals, and are not described again here.

As shown in FIG. 16, in the second surface 41 of the second member 40 which configures the flow path member 20 according to the present embodiment, a second-member-side concave portion 45 is provided. In the same manner as that of the concave portion 32 of the first member 30, it is preferable that the second-member-side concave portion 45 has a shape in which the width of the cross-section is the largest at the opening portion. In particular, a shape in which the width of the cross-section continues gradually decreasing from the Z1 side toward the Z2 side. Accordingly, the transverse section of the second flow path 202 can set as the generally circular shape and a portion of which the ink flown to the second flow path 202 is stagnated can be reduced.

In addition, in the transverse section of the second flow path 202, it is preferable that the second-member-side concave portion 45 is formed such that the width of the opening of the first member 30 side is smaller than that of the opening at the second member 40 side of the concave portion 32 of the first member 30. Accordingly, even when the first member 30 and the second member 40 are displaced in a width direction of the transverse surface of the second flow path 202, it is suppressed that the second-member-side concave portion 45 from being covered with the director 34. Accordingly, it is possible to stabilize the shape of the second flow path 202.

By setting the width of the opening of the second-member-side concave portion 45 to smaller than the width of the concave portion 32 of the first member 30, a corner portion is formed in a portion at which the first wall 33 of the concave portion 32 or the wall surface 34a of the director 34 comes into contact with the second surface 41. According to this, by providing the third member 50 including the third wall 51 same as Embodiment 1 described above at the corner portion, the second flow path 202 can be further closer to a circle by the first wall 33, the second wall 41, and the third wall 51, and it is possible to improve the air bubble dischargeability.

Other Embodiments

Hereinabove, each embodiment of the invention is described. However, the basic configuration of the invention is not limited the above-described configuration.

Figure 17:
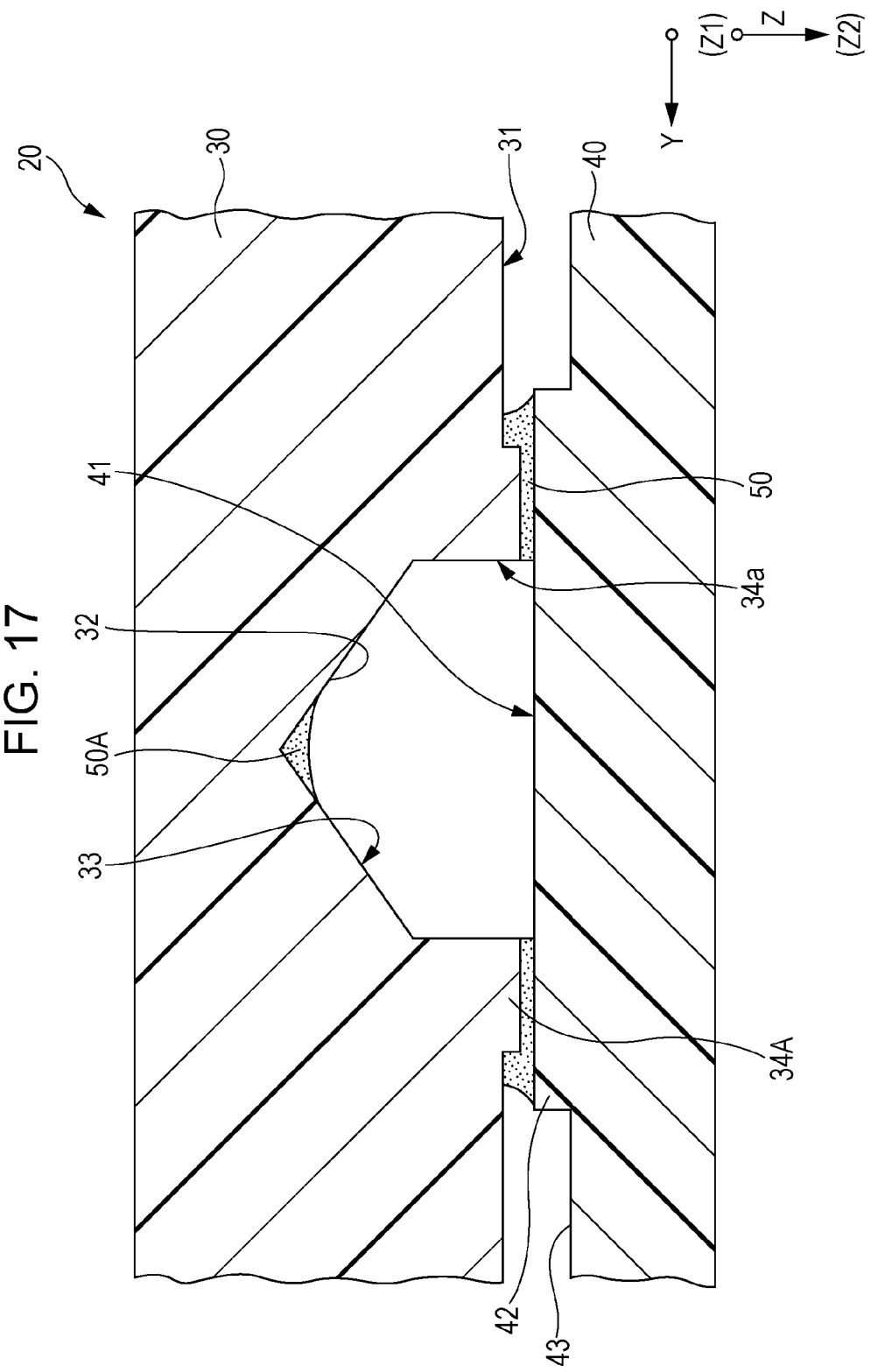
FIG. 17 is a sectional view of a modification example of a flow path member according to another embodiment of the invention.

For example, in each embodiment described above, the directors 34, 34A, and 34B fused are provided in the interface portion between the first wall 33 and the second wall 41, but it is not particularly limited thereto. For example, as shown in FIG. 17, the directors may be introduced in a portion having an acute angle other than the interface between the first wall 33 and the second wall 41 and then may be cured. That is, as shown in FIG. 17, in a case where a corner portion in which the vertex portion of the concave portion 32 of the first member 30 has an acute angle, the directors 34, 34A, and 34B fused are introduced into the vertex portion to form a third member 50A. In other words, in a portion of which the fused director 34 is introduced, if the cross-section is a portion having an acute angle when viewed from a direction perpendicular from the laminating direction, the location is not particularly limited thereto.

Figure 18:
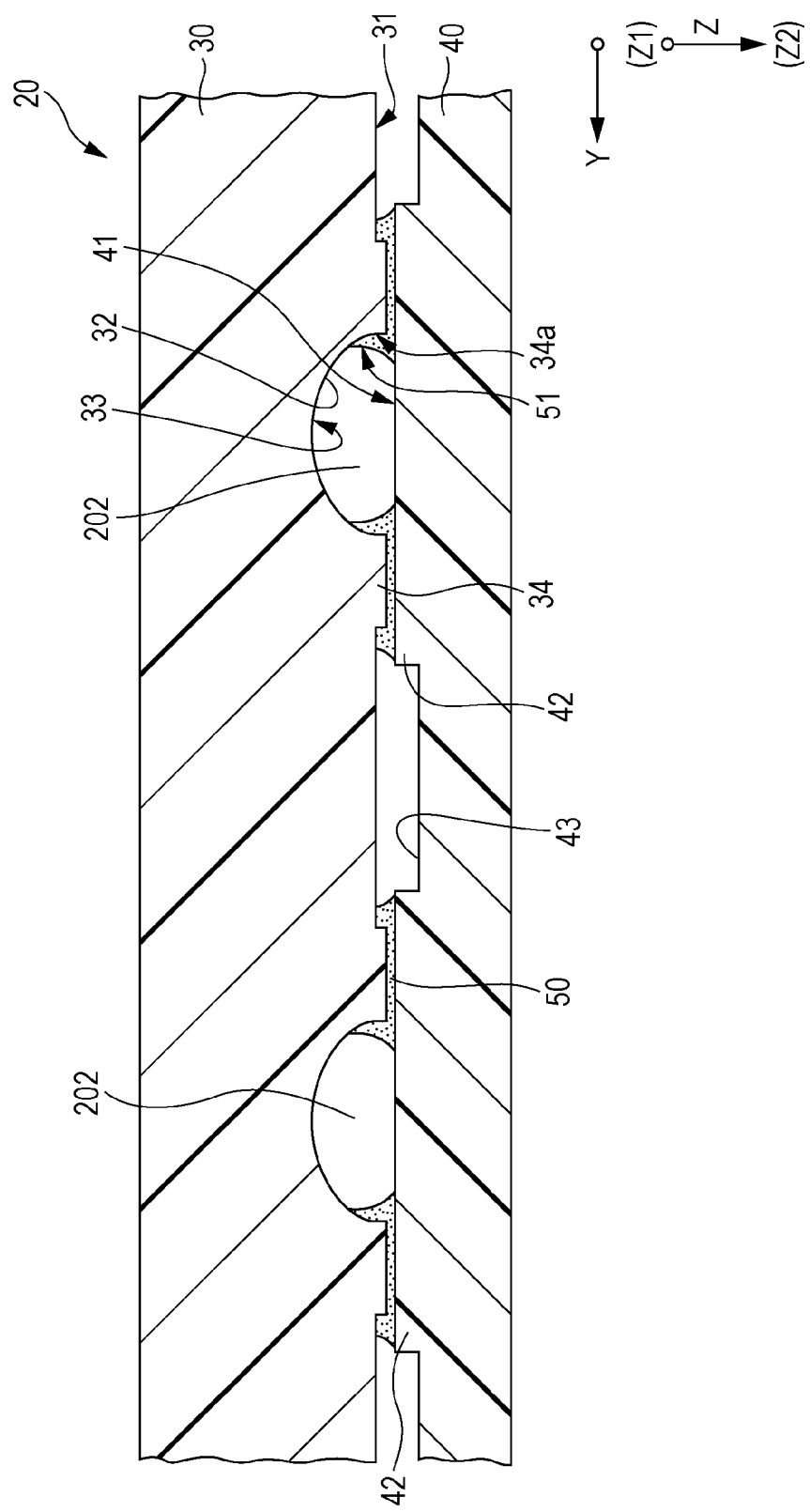
FIG. 18 is a sectional view of the modification example of the flow path member according to the other embodiment of the invention.

In addition, in each embodiment described above, an example of the configuration, in which one second flow path 202 is provided on the flow path member 20, is described. However, it is not particularly limited thereto. Two or more second flow paths 202 may be formed on one flow path member 20. Here, such an example is shown in FIG. 18. As shown in FIG. 18, in the flow path member 20, two second flow paths 202 are arranged in the second direction Y. In the second member 40, two convex portions 42 including the second surface 41 are provided. The common step portion 43 is provided between two convex portions 42. That is, the convex portions 42 adjacent to each other in the second direction Y are defined by the step portion 43 that is the common recess. According to this, since two second surfaces 41 are commonly defined by one step portion 43, the second member 40 is easily manufactured. A plurality of second flow paths 202 provided in one flow path member 20 may be provided such that one second flow path 202 is branched several in the way.

Furthermore, in each embodiment described above, the directors 34, 34A, and 34B are exemplified that are integrally provided in the first member 30. However, it is not particularly limited thereto. For example, the directors 34, 34A, and 34B may be integrally formed on the second member 40, and the directors 34, 34A, and 34B may be provided separated from the first member 30 and the second member 40. In a case where the directors 34, 34A, and 34B are provided separated from the first member 30 and the second member 40, the directors 34, 34A, and 34B and the first surface 31 are welded to each other by the directors 34, 34A, and 34B.

In addition, in each embodiment described above, the second flow path 202 formed by covering the concave portion 32 with the second surface 41 is a flow path along the first direction X. However, it is not limited thereto. The second flow path 202 may be a flow path along the third direction Z. The flow path in which the ink flows in the laminating direction between the first member 30 and the second member 40 may be formed by the concave portion 32 and the second surface 41.

Furthermore, in each embodiment described above, as a pressure generating unit causing a pressure change in the pressure generation chamber 112, it is described using a thin film-type piezoelectric actuator 11. However, it is not particularly limited thereto. For example, it is possible to use a thick film-type which is formed by a method such as attaching a green sheet or the like can be used or a longitudinal vibration-type piezoelectric actuator extending and retracting in the axial direction by alternately laminating a piezoelectric material and an electrode forming material. In addition, as the pressure generating unit, by disposing the heating elements in the pressure generation chamber, it is possible to use the generation of static electricity between the nozzle opening and to eject a droplet, the diaphragm and the electrode by a bubble generated in the heat generation of heat generating element on, or so-called electrostatic actuator to eject droplets from the nozzle openings by deforming the vibration plate by electrostatic force.

Furthermore, in each embodiment described above, as the ink jet recording apparatus 1, a so-called line type recording apparatus in which the recording head 2 is fixed to the housing (not shown) and performs printing only by transporting the recording sheet S, is exemplified. But it is not particularly limited thereto. For example, a direction which intersects the recording head 2 and the second direction Y which is the transporting direction of the recording sheet S, for example, the recording head 2 is mounted on a carriage which moves in the first direction X, printing is performed while moving the recording head 2 in the first direction X, and can the present invention also be applied to a so-called serial type recording apparatus.

Furthermore, the present invention has a wider target liquid ejecting heads in general. For example, the present invention can also be applied to a recording head such as various ink jet type recording head used in an image recording apparatus such as a printer, a color material ejecting head used for manufacturing a color filter of a liquid crystal display or the like, an electrode material ejecting head of an organic EL display, a field emission display (FED), or the like, and a bioorganic material ejecting head used for manufacturing a bio-chip.

Furthermore, the invention is not limited to the flow path member to be used in the liquid ejecting head and may be the flow path member which is connected to the liquid ejecting head via the supply pipe or other flow path members. It may have applicability to the flow path member to be mounted on other devices.

The entire disclosure of Japanese Patent Application No.: 2015-214960, filed Oct. 30, 2015 is incorporated by reference herein.

What is claimed is:

1. A flow path member comprising:
   a flow path which is defined by
      a first wall defined by a first member in which a transmittance with respect to a wavelength is a first value,
      a second wall defined by a second member in which the transmittance with respect to the wavelength is a second value greater than the first value, and
      a third wall defined by a third member in which the transmittance with respect to the wavelength is a third value between the first value and the second value,
   wherein the third wall is disposed in an interface between the first wall and the second wall, and
   wherein the third wall is disposed in contact with the first wall and the second wall respectively, at an angle larger than an angle of a supposed portion of which the first wall and the second wall comes into contact with each other.

2. The flow path member according to claim 1, wherein a width of the second wall is smaller than a width of the first wall.

3. The flow path member according to claim 1, wherein a width in the cross-section of the flow path defined by the first wall becomes the largest at an opening portion.

4. The flow path member according to claim 3, wherein the flow path includes a vertex on a side facing the second member.

5. The flow path member according to claim 1, wherein the third wall of the third member has a concave curved surface connecting the first wall and the second wall.

6. The flow path member according to claim 1, wherein in a portion of which the flow path is formed, a thickness of the first member is larger than a thickness of the second member.

7. The flow path member according to claim 1, wherein with respect to the interface between the first wall and the second wall, a depth of the first member side of the flow path is larger than a depth of the second member side on the flow path.

8. A liquid ejecting head comprising:
   the flow path member according to claim 1.

* * * * *